United States Patent
Yamamura et al.

(10) Patent No.: US 6,914,356 B2
(45) Date of Patent: Jul. 5, 2005

(54) ROTATING ELECTRIC MACHINE AND METHOD FOR MANUFACTURING THE SAME

(75) Inventors: Akihiro Yamamura, Tokyo (JP);
Tetsunao Takaki, Tokyo (JP); Tsuyoshi Takahashi, Tokyo (JP); Akifumi Miyake, Tokyo (JP); Akira Izawa, Tokyo (JP); Hiromu Nonoguchi, Tokyo (JP); Kazuo Matsunaga, Tokyo (JP); Hiroyuki Akita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/302,867

(22) Filed: Nov. 25, 2002

(65) Prior Publication Data
US 2003/0201688 A1 Oct. 30, 2003

(30) Foreign Application Priority Data
Apr. 26, 2002 (JP) .................................... P 2002-125800

(51) Int. Cl.$^7$ ............................................... H02K 11/00
(52) U.S. Cl. .......................................... 310/71; 310/71
(58) Field of Search .......................... 310/71, 179, 260, 310/67 R, 254

(56) References Cited

U.S. PATENT DOCUMENTS

| 5,828,147 A | * | 10/1998 | Best et al. ..................... 310/71 |
| 6,600,244 B2 | * | 7/2003 | Okazaki et al. ................ 310/71 |
| 2002/0047365 A1 | | 4/2002 | Yagyu et al. |
| 2002/0067094 A1 | | 6/2002 | Masafumi et al. |

FOREIGN PATENT DOCUMENTS

| JP | 11-18345 | 1/1999 |
| JP | 2001-298880 | 10/2001 |

* cited by examiner

Primary Examiner—Darren Schuberg
Assistant Examiner—Leda Pham
(74) Attorney, Agent, or Firm—Sughrue Mion, PLLC

(57) ABSTRACT

A conductive member includes a strip conductive portion 24 and an arm portion 22 integral with the strip conductive portion 24 and extending from a side end portion 24a of the strip conductive portion 24 to be almost parallel in a longitudinal direction, the arm portion being bent in a direction of plate thickness for the strip conductive portion 24.

17 Claims, 29 Drawing Sheets

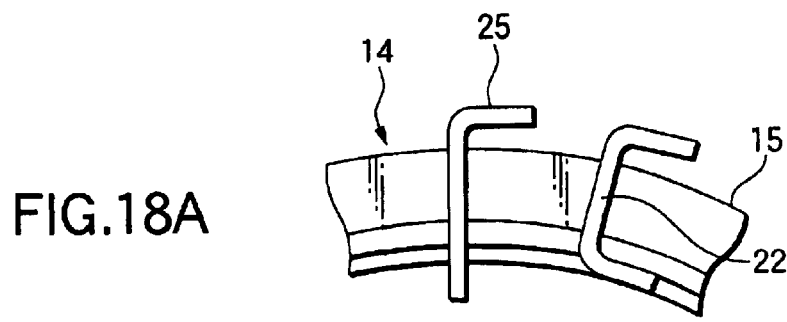
FIG.18A
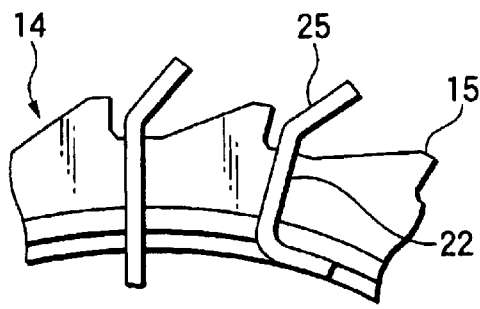
FIG.18B
FIG.19A
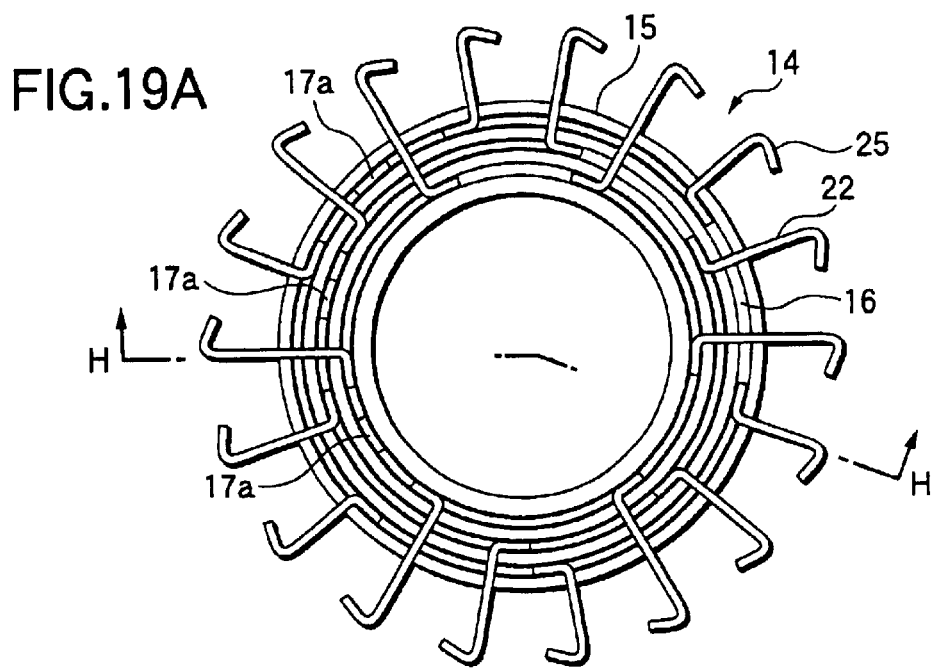
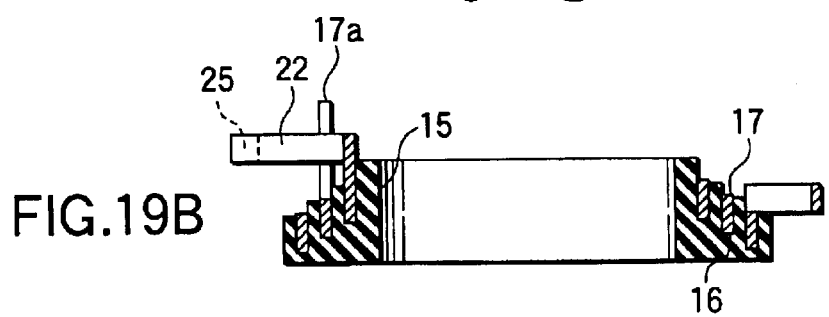
FIG.19B

FIG.28
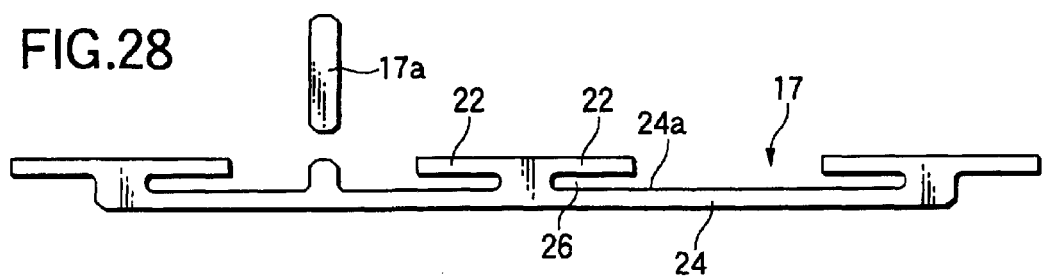
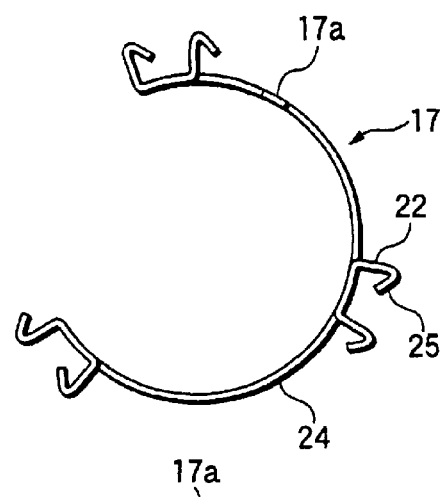
FIG.29A
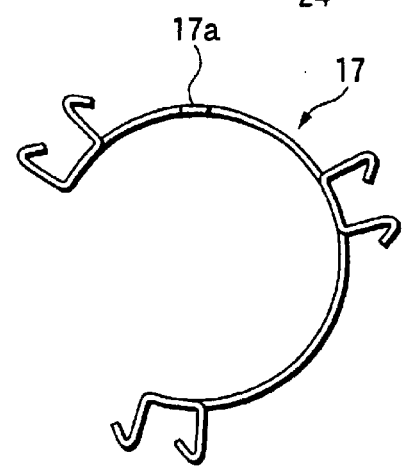
FIG.29B
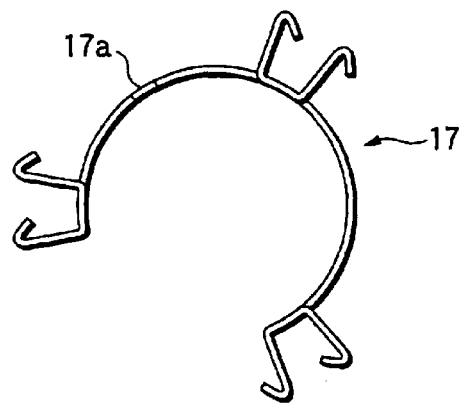
FIG.29C

ROTATING ELECTRIC MACHINE AND METHOD FOR MANUFACTURING THE SAME

BACKGROUND OF THE INVENTION

1. Field of the Invention

The present invention relates to a rotating electric machine and a method for manufacturing the same, and more particularly to a coil connecting structure.

2. Related Art

The conventional device with a coil connecting structure for a rotating electric machine was disclosed in the Unexamined Japanese Patent Application Publication Nos. Hei11-18345 and 2000-333400, for example. Firstly, in the Unexamined Japanese Patent Application Publication No. Hei11-18345, a conductive member is formed like a strip from a conductive material and has a plurality of terminal pieces on the side face, each terminal piece being jutted through an insertion hole and bent outwards. Also, the terminal piece has a U-character groove on the side face of the strip conductor, and the stator winding has its start end and terminal end fitted into this groove and soldered. Secondly, in the Unexamined Japanese Patent Application Publication No. 2000-333400, a lead frame is formed like a tape, the tape-like lead frames are placed vertically and laminated in almost concentric circle form with a spacer between frames, and the lead frames with spacers are integrally buried by resin and molded. The lead frame is formed by press, and then fed forward to bend the connection terminal, which is formed with a connection groove of U-character shape for connection with the winding of a motor or an external lead wire.

The above conventional devices have a terminal portion jutting out from the side end portion of the strip conductor in a direction perpendicular to the longitudinal direction of the strip conductor, the terminal portion having a U-character groove on the side face of the strip conductor.

The conventional device constituted in the above manner had a problem that the yield of material was bad formally in any means, even though the materials were appropriately adopted, because the terminal portion juts out from the side end portion of the strip conductor in the direction perpendicular to the longitudinal direction of the strip conductor. In particular, when the strip conductor is disposed like a concentric circle to allow the terminal portion to jut out beyond other strip conductors on the inner circumferential side and the outer circumferential side, the terminal portion is lengthened, resulting in a problem that the yield of material is worse. Though the terminal portion has a U-character groove on the side face of the strip conductor, the terminal portion has a contact face with the coil in a plate thickness of the strip conductor, when welded with the coil, resulting in a problem that the large contact area in welding can not be taken for sufficient bonding, and when soldered, a large amount of solder is required, and the heat resistance is lowered to be unsuitable for large current. Therefore, if the plate thickness of the strip conductor is increased, there is a problem that the strip conductor is increased in size and difficult to work. Furthermore, the U-character groove had a problem that the coil is difficult to be inserted into the groove.

SUMMARY OF THE INVENTION

This invention is achieved in the light of the above-mentioned problems, and it is an object of the invention to provide a rotating electric machine and a method for manufacturing the rotating electric machine, in which an arm portion integral with a strip conductive portion and extending from a side end portion of the strip conductive portion to be almost parallel in a longitudinal direction is bent in a direction of plate thickness for the strip conductive portion, whereby the yield of material is excellent, the bonding with the coil is excellent, and the rotating electric machine is inexpensive, and is superior in the productivity and performance.

A rotating electric machine as defined in aspect 1 of the present invention comprises a conductive member including a strip conductive portion and an arm portion integral with the strip conductive portion and extending from a side end portion of the strip conductive portion to be almost parallel in a longitudinal direction, the arm portion being bent in a direction of plate thickness for the strip conductive portion, an insulating material for holding the conductive member, and a plurality of wound coils.

The rotating electric machine as defined in aspect 2 is characterized in that a coil connecting terminal portion formed in the arm portion has a hook shape.

The rotating electric machine as defined in aspect 3 is characterized in that the coil connecting terminal portion formed in the arm portion has a hook shape of being bent in the almost same direction as the circumference direction.

The rotating electric machine as defined in aspect 4 is characterized in that an in-phase split phase conductive member among the conductive members is divided into plural sections, each section having a connection terminal.

The rotating electric machine as defined in aspect 5 is characterized in that a connection terminal for the split phase conductive member among the conductive members is formed by using both the end portions of the strip conductive portion for the split phase conductive member.

The rotating electric machine as defined in aspect 6 is characterized in that the connection terminal for the split phase conductive member among the conductive members is formed by bending an end portion of the strip conductive portion for the split phase conductive member within the almost same plane as the strip conductive portion.

The rotating electric machine as defined in aspect 7 is characterized in that the insulating material has a groove portion for insulating a plurality of conductive members from each other, the conductive member being disposed in the groove portion.

The rotating electric machine as defined in aspect 8 is characterized in that the insulating material has a groove portion of almost concentric circle for insulating a plurality of conductive members from each other, the conductive member being disposed like almost concentric circle in the groove portion.

The rotating electric machine as defined in aspect 9 is characterized in that a common conductive member among the conductive members is disposed on the outer circumferential side of the groove portion of almost concentric circle for the insulating material.

The rotating electric machine as defined in aspect 10 is characterized in that the insulating material has a guide for leading the coil terminal to the coil connecting terminal portion.

The rotating electric machine as defined in aspect 11 is characterized in that the insulating material has a groove portion through which the arm portion is inserted.

The rotating electric machine as defined in aspect 12 is characterized by further comprising a coil bobbin for insulating an iron core and a coil, in which the groove portion is formed integrally with the coil bobbin, and the conductive member is disposed in the groove portion.

A method for manufacturing a rotating electric machine as defined in aspect 13 of this invention includes a step of forming a conductive member including a strip conductive portion and an arm portion integral with the strip conductive portion and extending from a side end portion of the strip conductive portion to be almost parallel in a longitudinal direction, the arm portion being bent in a direction of plate thickness for the strip conductive portion, a step of disposing the conductive member in an insulating material having a groove portion of almost concentric circle, and a step of connecting electrically a coil to the arm portion.

BRIEF DESCRIPTION OF THE DRAWINGS

FIGS. 18A and 18B are explanatory views essentially showing another guide.

FIGS. 19A and 19B are a front view and a cross-sectional view of a coil connector according to an embodiment 7 of this invention.

FIG. 28 is an expanded view of a split phase conductive member according to the embodiment 9 of this invention.

FIGS. 29A and 29C are front views of a split phase conductive member according to the embodiment 9 of this invention.

DETAILED DESCRIPTION OF THE PREFERRED EMBODIMENTS (Embodiment 1)

Figure 1:
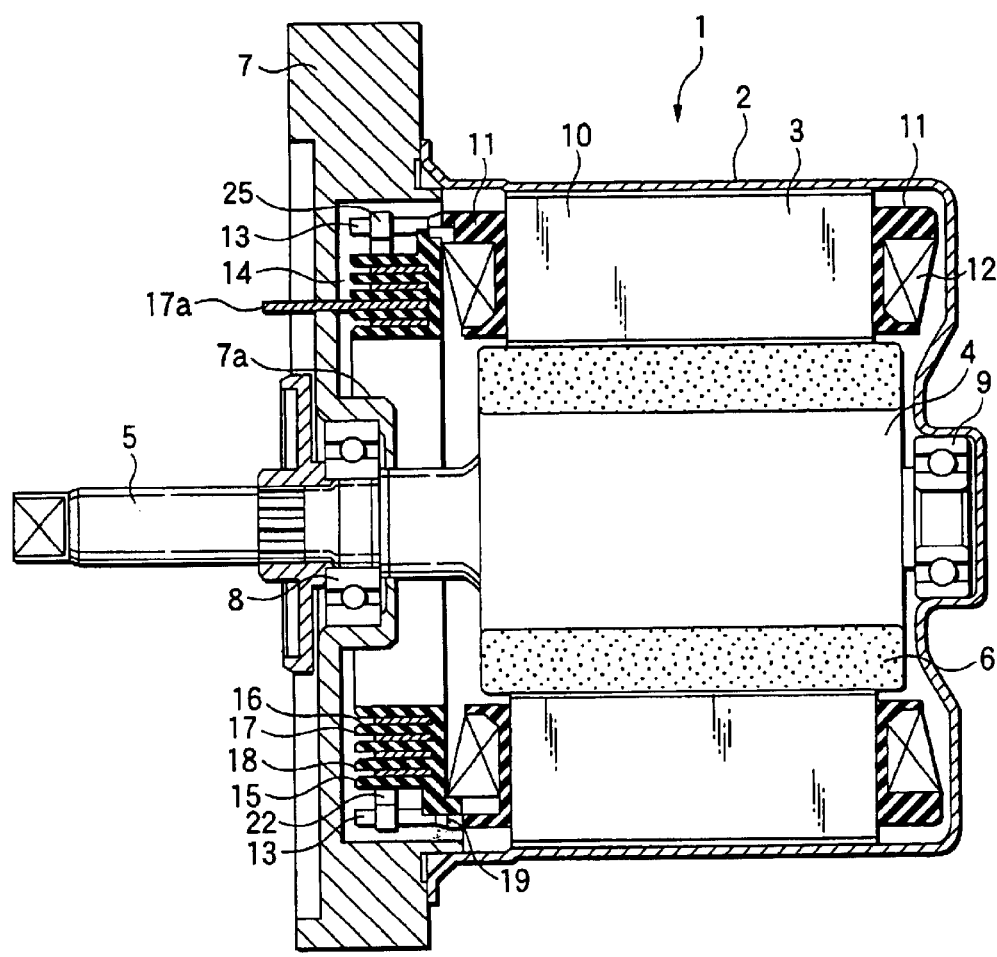
FIG. 1 is a cross-sectional view of a rotating electric machine according to the present invention.
Figure 2:
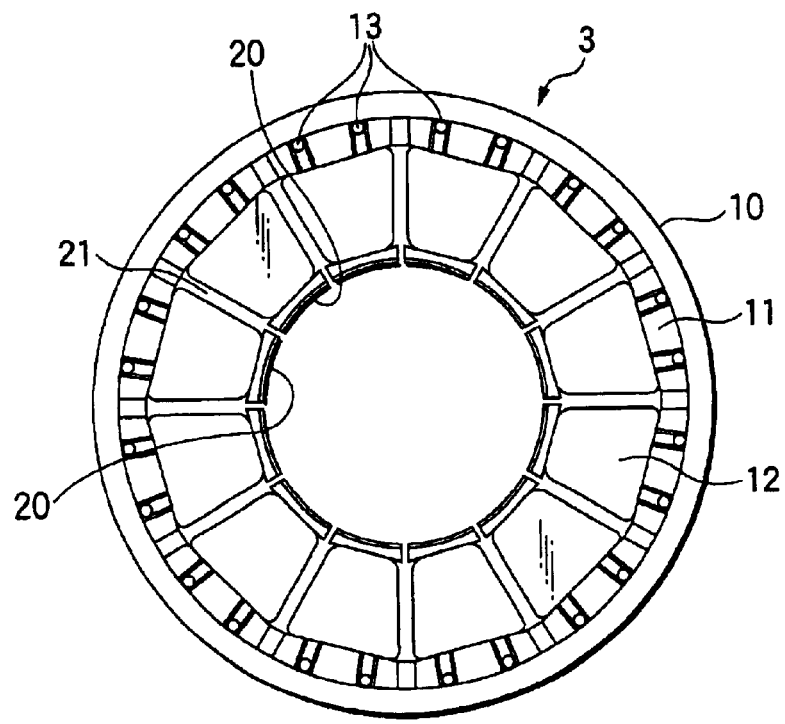
FIG. 2 is a front view of a stator according to an embodiment 1 of this invention.
Figure 3:
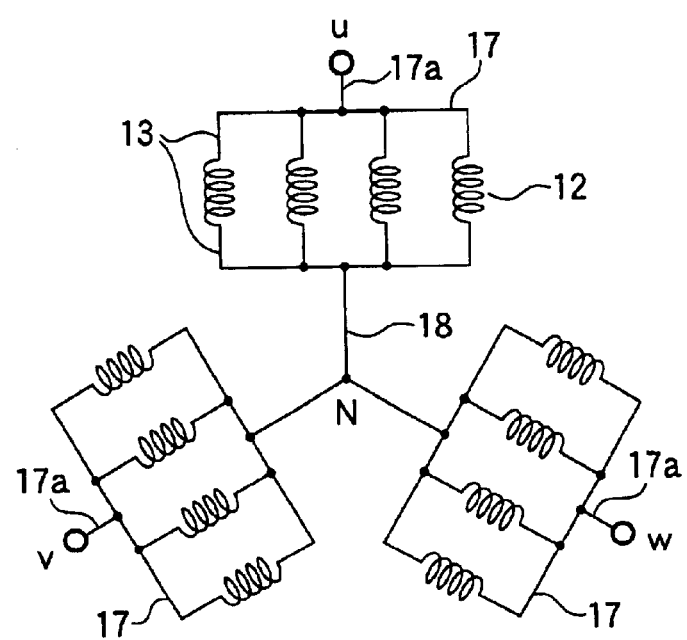
FIG. 3 is a connection view of a stator coil according to the embodiment 1 of this invention.

An embodiment 1 of the present invention will be described with reference to the drawings. FIG. 1 is a cross-sectional view of a brushless motor for electric power steering gear for the vehicle as one example of a rotating electric machine according to the present invention. FIG. 2 is a front view of a stator. FIG. 3 is a connection view of a stator coil.

Figure 4A:
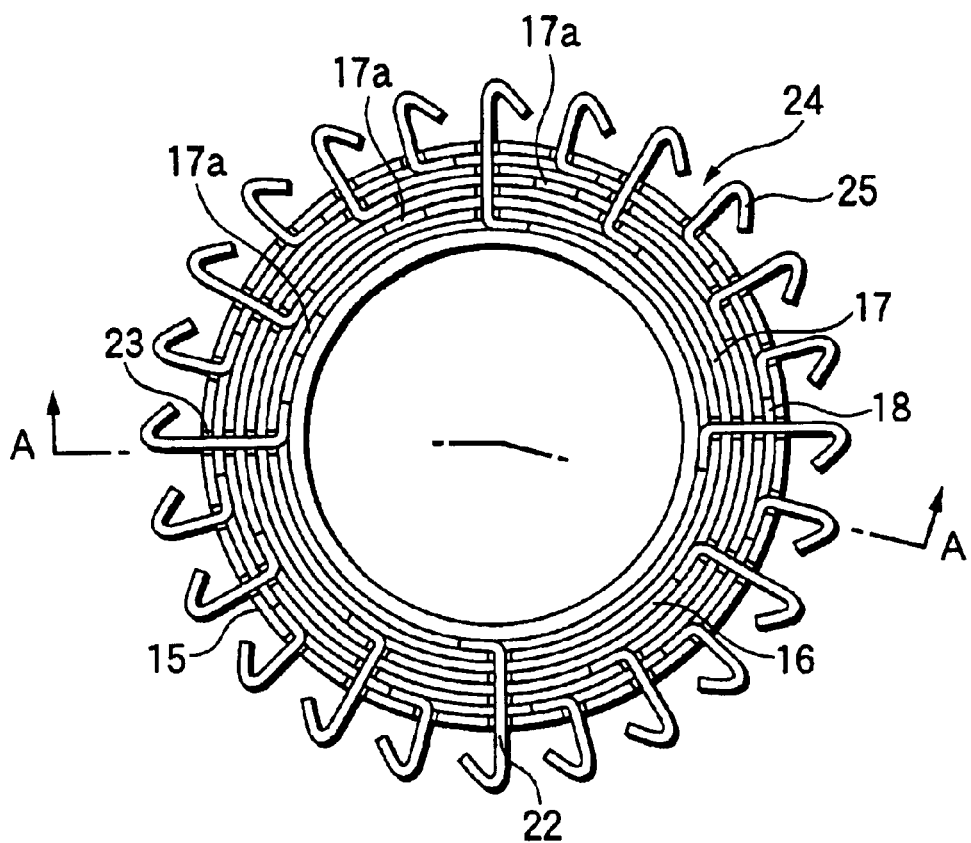
FIGS. 4A and 4B are a front view and a cross-sectional view of a coil connector according to the embodiment 1 of this invention.
Figure 4B:
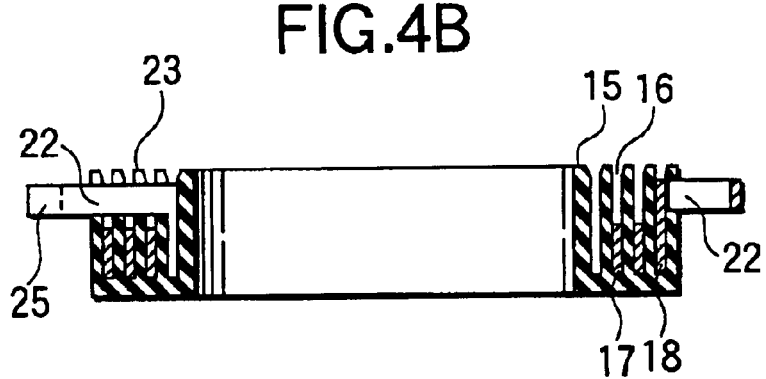
Figure 5A:
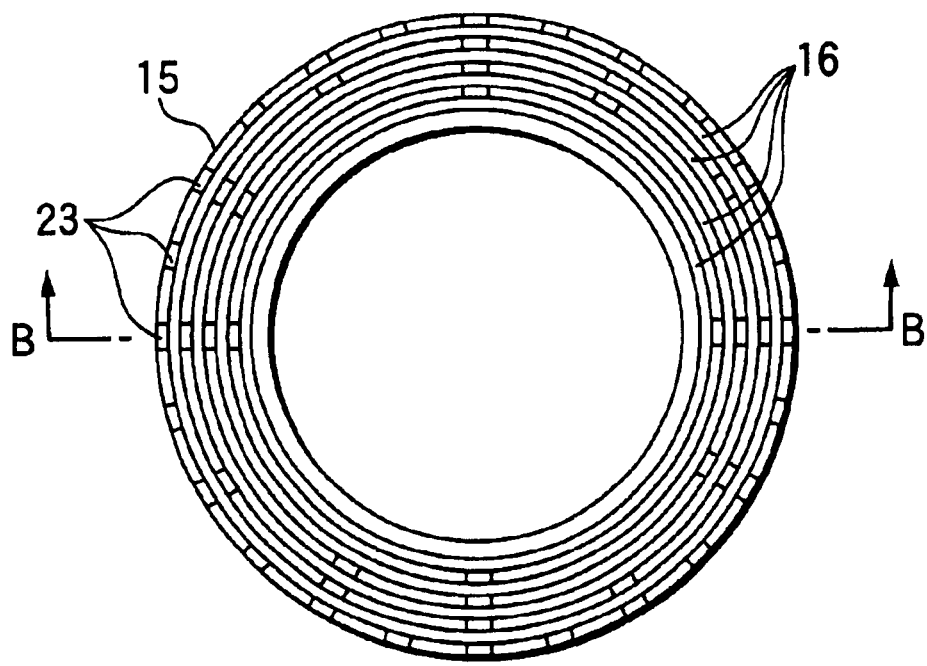
FIGS. 5A and 5B are a front view and a cross-sectional view of a holder according to the embodiment 1 of this invention.
Figure 5B:
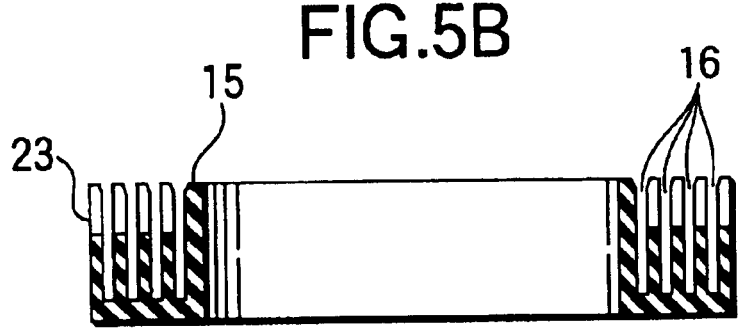
Figure 6A:
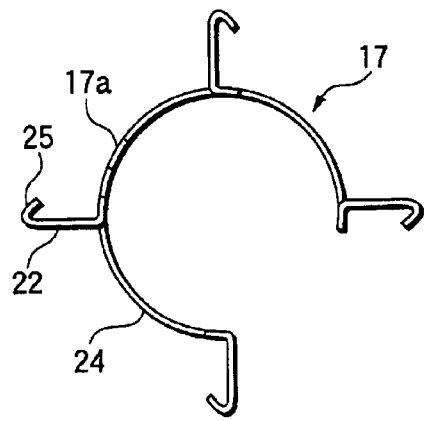
FIGS. 6A to 6D are front views of a conductive member according to the embodiment 1 of this invention.
Figure 6B:
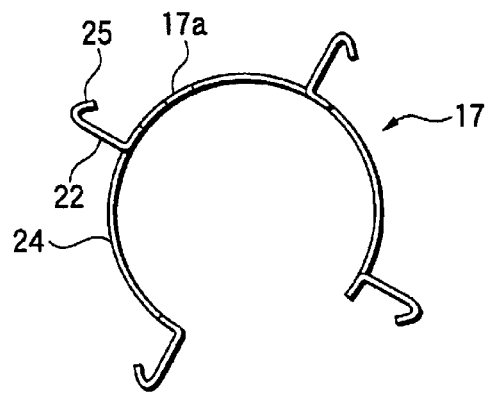
Figure 6C:
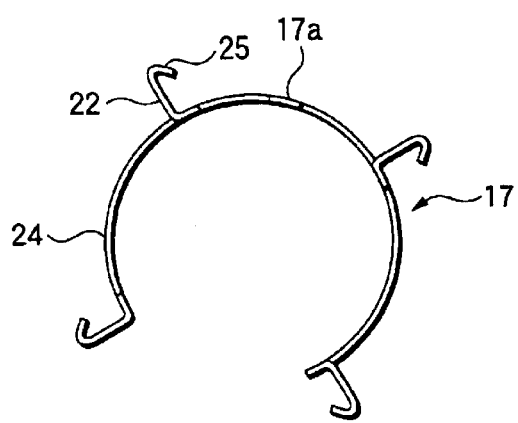
Figure 6D:
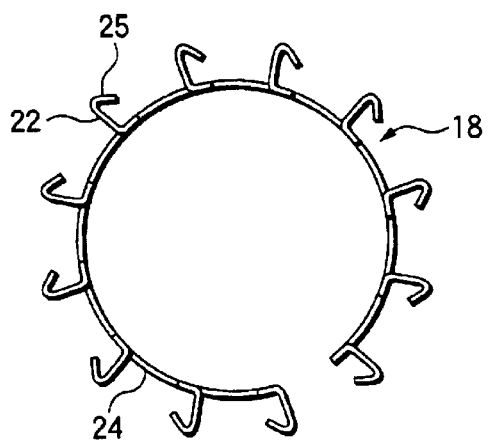
Figure 7A:
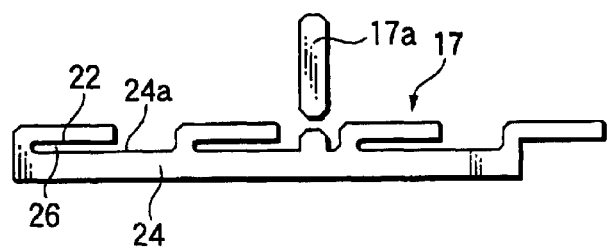
FIGS. 7A and 7B are expanded views of the conductive member according to the embodiment 1 of this invention.
Figure 7B:
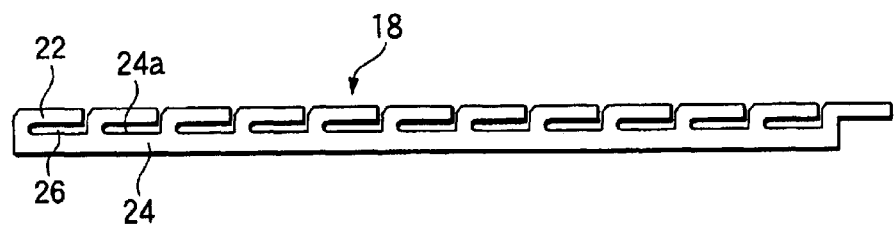

FIG. 4A is a front view of a coil connector, and FIG. 4B is a cross-sectional view of the coil connector, taken along the line A—A. FIG. 5A is a front view of a holder, and FIG. 5B is a cross-sectional view of the holder, taken along the line B—B. FIGS. 6A, 6B and 6C are front views of a split phase conductive member, and FIG. 6D is a front view of a common conductive member. FIG. 7A is an expanded view of the split phase conductive member, and FIG. 7B is an expanded view of the common conductive member. The same or like parts are designated by the same numerals throughout the drawings. In FIG. 1, 1 denotes a motor, in which the stator 3 is press fit into the inner circumference of a frame 2, and a rotor 4 is disposed via a clearance within an internal bore of the stator 3. The rotor 4 has an eight-pole magnet 6 bonded to a shaft 5 by adhesives, and supported to be freely rotatable by a bearing 8 provided in a housing 7 and a bearing 9 provided between the other end of the shaft 5 and the frame 2.

The stator 3 includes a stator iron core 10 having electromagnetic steel plates laminated, a coil bobbin 11 molded by Nylon that is attached with insulation to the stator iron core 10, and a stator coil 12 wound around the coil bobbin 11. The stator coil 12 is an enamel coated copper wire having a wire diameter of about φ1 to φ2, and a coil connector 14 is disposed on the side of the stator 3 to connect a coil terminal 13 which is the start end or terminal end of the stator coil 12. The coil connector 14 has a split phase conductive member 17 or an in-phase conductive member 18 fitted in a groove portion 16 provided in the holder 15 made of the insulating material, in which the split phase conductive member 17 or the in-phase conductive member 18 is connected to the coil terminal 13 via a fuse to make a predetermined connection. A power source for supply electric power to the motor 1 is connected to a connection terminal 17a provided in the split phase conductive member 17. The coil connector 14 is integrated with the stator 13 when an engaging pawl 19 integral with the holder 15 engages the coil bobbin 11.

FIG. 2 is a front view of the stator 3. Twelve teeth 20 and twelve slots 21 made between teeth 20 are provided within the internal bore of the stator iron core 10, and insulated from the stator iron core 10 by attaching the coil bobbins 11, in which the stator coil 12 is wound (concentrated winding) around each of the teeth 20 to constitute twelve stator coils 12. The coil terminal 13 is led out upwards in the figure (see the coil terminal 13 of FIG. 1). In this case, the coil terminals 13 that are the start end or terminal end of winding the twelve stator coils 12, namely, a total of twenty four coil terminals 13 are led out. FIG. 3 is a connection view of the stator coil 12, in which twenty four coil terminals 13 are Y-connected in three phases (12-slot, 4-coil parallel Y-connection), as shown in FIG. 3.

FIG. 4A is a front view of the coil connector 14, and FIG. 4B is a cross-sectional view of the coil connector 14, taken along the line A—A. FIG. 5A is a front view of the holder 15 constituting the coil connector 14, and FIG. 5B is a cross-sectional view of the holder, taken along the line B—B. FIGS. 6A, 6B and 6C are front views of the split phase conductive member 17 constituting the coil connector 14, and FIG. 6D is a front view of the common conductive member 18 constituting the coil connector 14. FIG. 7A is an expanded view of the split phase conductive member 17, and FIG. 7B is an expanded view of the common conductive member 18. In FIG. 4, the coil connector 14 has the split phase conductive member 17 and the in-phase conductive member 18 which are disposed in the groove portion 16 of concentric circle shape provided in the holder 15 made of a resin material such as Nylon like a doughnut and serving as the insulator. The inner diameter of the holder 15 is larger than the outer diameter of the magnet 6, so that the rotor 4 can be inserted into the holder 15. Moreover, the inner diameter of the holder 15 is larger than the outer diameter of a support portion 7a for the bearing 8 provided in the housing 7, so that the support portion 7a is lapped axially on the inner circumference of the holder 15 to shorten the overall length. The holder 15 has four groove portions 16 of concentric circle shape, as shown in FIG. 5, and a groove portion 23 through which the arm portion 22 is inserted.

The split phase conductive member 17 and the in-phase conductive member 18 are shaped as shown in FIG. 6, in which a strip conductive member made from a copper plate having a plate thickness of about 1 mm is press cut into a shape as shown in an expanded view of FIG. 7, and bent. FIG. 7A is an expanded view of the split phase conductive member 17. 24 denotes a strip conductive portion having the arm portion 22 integral with the strip conductive portion 24 and extending from a side end portion 24a of the strip conductive portion 24 to be almost parallel in its longitudinal direction. An adequate clearance 26 is provided between the side end portion 24a and the arm portion 22. The arm portion 22 is bent in a direction of plate thickness for the strip conductive portion 24 as shown in FIG. 6A. A coil connecting terminal portion 25 like the hook is provided at the top end of the arm portion 22. The strip conductive portion 24 is also bent circularly in the direction of plate thickness to form the split phase conductive member 17. 17a denotes a connection terminal, which is press cut from the strip conductive member, and bonded with the split phase conductive member 17 by TIG welding. Also, the common conductive member 18 as shown in FIG. 7B and FIG. 6D is formed in the same manner as the split phase conductive member 17. The conductive member disposed on the inner circumference constitutes the arm portion 22 crossing over the conductive member on the outer circumference.

As shown in FIG. 6, three split phase conductive members 17 (FIGS. 6A, 6B and 6C) and one common conductive member 18 (FIG. 6D), which are formed as above described, are inserted into the groove portions 16 and the groove portion 23 of the holder 15, and insulated. Then, in the holder 15 with the groove portions, the common conductive member 18 is disposed on the outer circumference side, and three split phase conductive members 17 are disposed in the order of 17c, 17b and 17a on the inner circumference side, thereby making up the coil connector 14 as shown in FIG. 4. The coil connector 14 has the coil connecting terminal portion 25 like the hook radially on the outer circumferential side, which is bent in the almost same direction as the circumferential direction, corresponding to the coil terminal 13. These twenty four coil connecting terminal portions 25 are disposed within the same plane.

The operation of the rotating electric motor according to the embodiment 1 will be described below. If electric power is supplied from a power source, not shown, to the connection terminal 17a formed in each of three split phase conductive members 17, the shaft 5 is rotated owing to an electromagnetic force of the magnet 4 provided in the rotor 4, so that the electric power steering gear, not shown, is driven due to a rotating force of the shaft 5, because twenty four coil terminals 13 of twelve stator coils 12 in the stator 3 are Y-connected in three phases with the coil connector 14, as shown in FIG. 3. The brushless motor for electric power steering gear is a motor used at 12V and a relatively large current of about 50 to 100 A.

In the embodiment 1 as constituted in this manner, the conductive member has an excellent yield of material, and the connection terminal 17a has also an excellent yield of material, because the connection terminal 17a is a separate component. The arm portion 22 has a larger width than the plate thickness of the strip conductive member, with a large contact area with the coil, and thereby can be securely joined with the coil. Moreover, the arm portion 22 is joined more securely owing to the coil connecting terminal portion 25 like the hook, and applicable in uses where a large current or vibration is applied. Since the coil connecting terminal portion has a hook shape bent in the almost same direction as the circumferential direction, it can be easily inserted into the coil terminal 13. Moreover, a number of coil terminals 13 can be disposed at the same time. The coil connecting terminal portions 25 are disposed with the same plane, whereby the workability in joining the coil is favorable with the same welding jig and under the same welding conditions. The conductive members are disposed in the groove portions 16 of the holder 15, with excellent insulation, and disposed like the concentric circle corresponding to the positions of the coil terminals 13 to reduce the size. Also, the groove portion 23 is provided to prevent the conductive member from being deformed in assembling or welding, whereby the position of the coil connecting terminal portion 25 becomes stable to facilitate the assembly task, as well as enhancing the insulation between conductive members and the vibration resistance. Though the insulator uses the formed holder 15 in this embodiment, the conductive member may be integrally molded of insulating resin, in which the insulation and the vibration resistance are enhanced, but the cost is increased. Also, the holder 15 is not limited to the doughnut shape, but may be C shape.

Since an adequate clearance 26 is provided between the side end portion 24a and the arm portion 22, the insulation is enhanced. The arm portion 22 extending from the side end portion 24a of the strip conductive portion 24 to be almost parallel in the longitudinal direction is bent in the direction of plate thickness to cross over other conductive member, with reduced size. The arm portion 22 may not be just parallel to the longitudinal direction, but if the arm portion 22 is more deviated from parallelism to the longitudinal direction and is longer, the yield of material is worse. Therefore, the arm portion 22 is desirably as parallel to the longitudinal direction as possible. The arm portion 22 may be bent after it is disposed in the holder 15, in which case it is required to take care of the strength of the groove portions. Moreover, since the common conductive member 18 is disposed on the outer circumferential side, the length of the arm portion 22 can be shortened. Therefore, a number of arm portions 22 can be constructed in smaller size and with low resistance. The common conductive member 18 is disposed on the outer circumferential side, and three split phase conductive members 17 are disposed in the order of 17c, 17b and 17a on the inner circumferential side, with excellent assembling capability. The conductive member in which an inward portion of the strip conductor in width direction is lanced in the direction of plate thickness has less uniform resistance in a lanced portion, and is difficult to be disposed like the concentric circle so that the lanced portion strides over other conductive member, resulting in less action and effect of this invention.

(Embodiment 2)

Figure 8A:
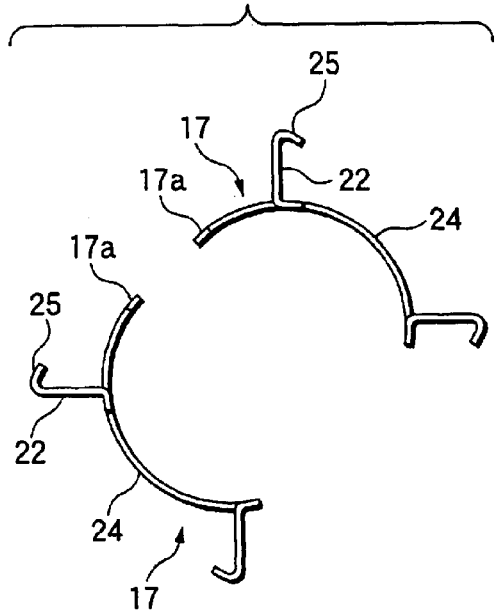
FIGS. 8A and 8B are front views of an in-phase split phase conductive member according to an embodiment 2 of this invention.
Figure 8B:
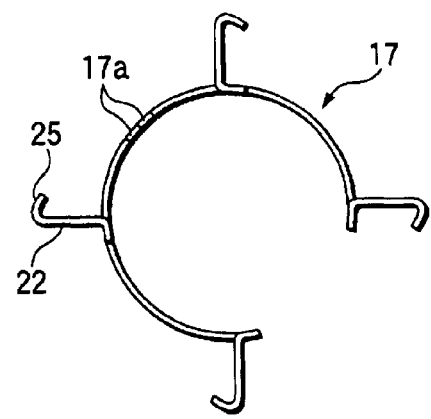
Figure 9A:
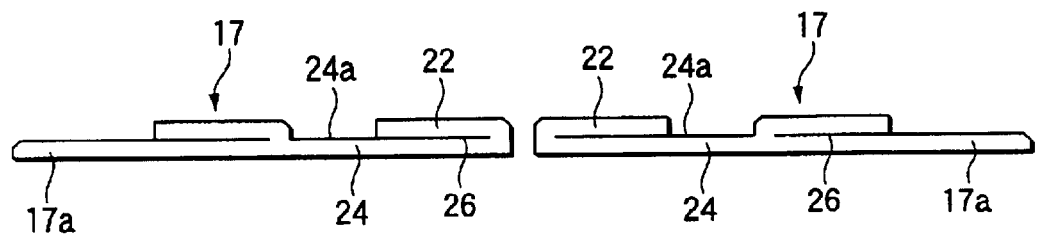
FIGS. 9A to 9C are expanded views of the in-phase split phase conductive member according to the embodiment 2 of this invention.
Figure 9B:
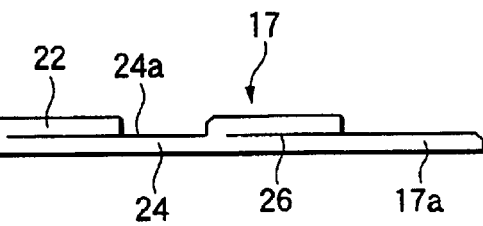
Figure 9C:
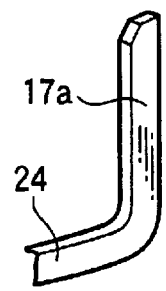

Referring to FIGS. 8 and 9, an embodiment 2 of this invention will be described below. FIG. 8 is a front view of an in-phase split phase conductive member. FIG. 9 is an expanded view of the in-phase split phase conductive member. In the embodiment 1, the split phase conductive member 17 as shown in FIG. 7A and FIGS. 6A to 6C has four arm portions 22 for each split phase conductive member, and the connection terminal 17a is a separate component, and joined by welding. However, in the embodiment 2, the split phase conductive member 17 is divided into two pieces as shown in FIGS. 9A and 9B, each piece having two arm portions 22. The connection terminal 17a is formed integrally, as shown in FIG. 9C, by bending an end portion of each strip conductive portion 24 of FIGS. 9A and 9B within the same plane. In this way, two split phase conductive members 17 of FIG. 8A are formed from the conductive members as shown in FIGS. 9A and 9B, and combined as shown in FIG. 8B to produce one in-phase split phase conductive member 17. Also, in this embodiment 2, there is a smaller clearance 26 between the side end portion 24a of the strip conductive portion 24 and the arm portion 22, which is formed by lancing with press, as shown in FIGS. 9A and 9B.

In the embodiment 2 as constituted in this manner, the connection terminal 17a is formed integrally by bending the end portion of the strip conductive portion 24 within the same plane, and there is a smaller clearance 26 between the side end portion 24a of the strip conductive portion 24 and the arm portion 22, whereby the yield of material is more excellent, and there is no need of welding. The end portion of the strip conductive portion 24 is bent within the same plane, and the groove portion 16 has a simple shape to allow the smooth insertion. Since the split phase conductive member 17 is divided into two pieces, each being shaped like a semi-circular arc, it is more easily assembled into the holder 15 than when formed circumferentially.

(Embodiment 3)

Figure 10A:
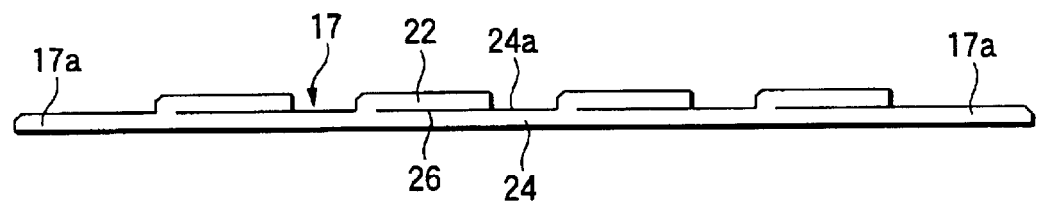
FIGS. 10A and 10B are an expanded view and a perspective view of a split phase conductive member according to an embodiment 3 of this invention.
Figure 10B:
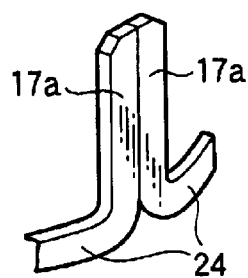

Referring to FIG. 10, an embodiment 3 of this invention will be described below. FIG. 10A is an expanded view of the split phase conductive member, and FIG. 10B is a perspective view showing a state where both the end portions of the strip conductive portion 24 are bent within the same plane and butted. In FIG. 10A, the split phase conductive member 17, like that as shown in FIG. 7A and FIG. 6A, has four arm portions 22. Though in the embodiment 1, the connection terminal 17a is a separate component and joined by welding, in the embodiment 3 both the end portions of the strip conductive portion 24 of FIG. 10A are bent within the same plane and butted, as shown in FIG. 10B. As in the embodiment 2, there is a smaller clearance 26 between the side end portion 24a of the strip conductive portion 24 and the arm portion 22, in which the arm portion 22 is formed by lancing with press.

In the embodiment 3 as constituted in this manner, the connection terminals 17a are formed integrally by bending the end portions of the strip conductive portion 24 within the same plane, whereby the yield of material is excellent, and there is no need of welding. Since the end portions of the strip conductive portion 24 are bent within the same plane, the groove portion 16 has a simple shape to allow the smooth insertion. Since the connection terminals 17a are formed using both the end portions of the strip conductive portion 24, the resistance value from the connection terminal 17a to each coil terminal 13 is decreased, and becomes uniform, resulting in enhanced performance of the motor. In particular, it is possible to reduce the torque ripple that is important in the electric power steering gear motor. This embodiment 3 is not limited to the split phase conductive member 17, but may be applied to the common conductive member 18.

(Embodiment 4)

Figure 11A:
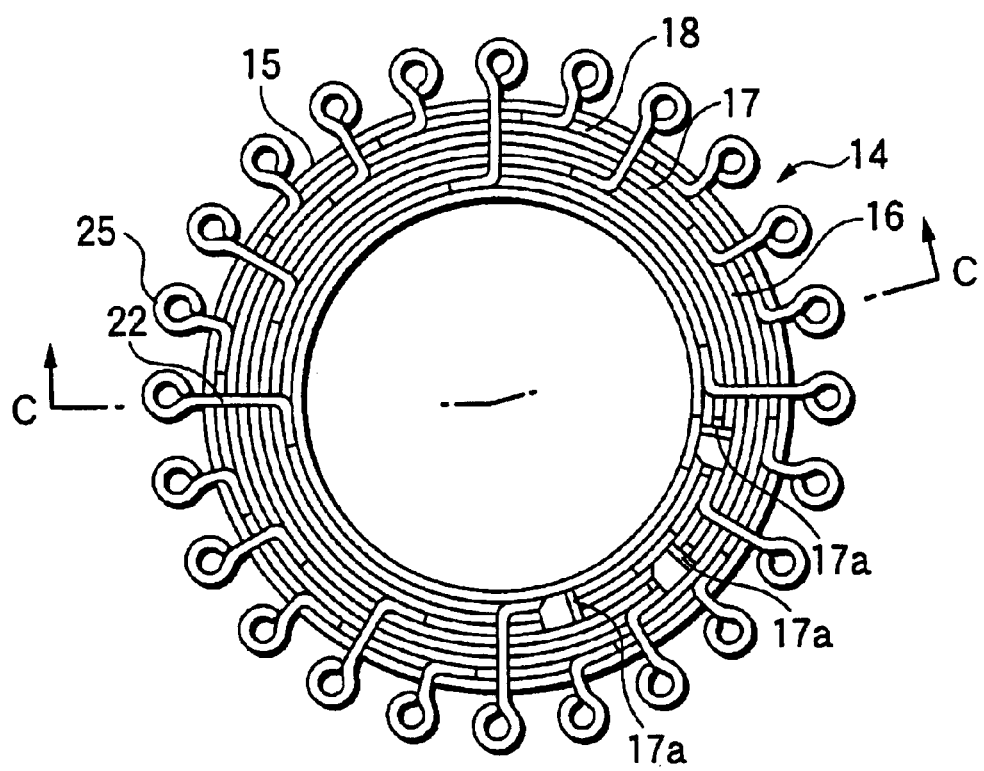
FIGS. 11A and 11B are a front view and a cross-sectional view of a coil connector according to an embodiment 4 of this invention.
Figure 11B:
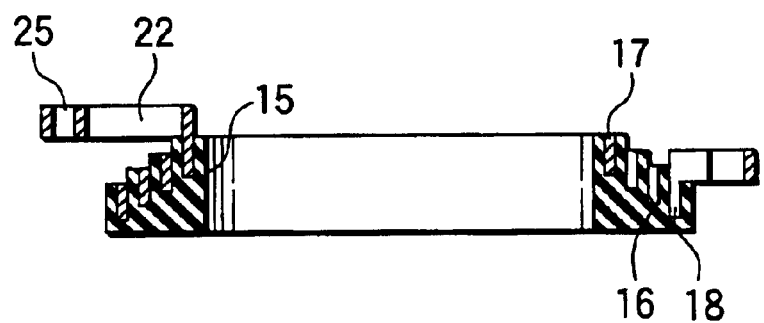
Figure 12A:
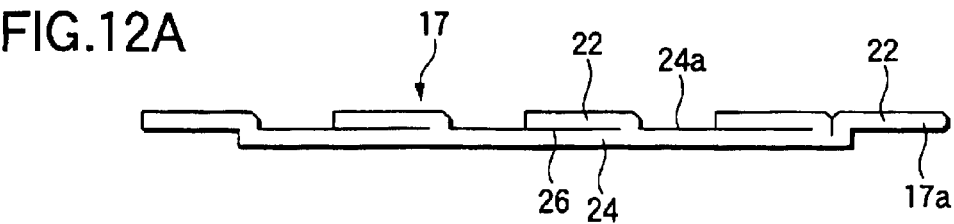
FIGS. 12A to 12C are an expanded view and a perspective view of a conductive member according to the embodiment 4 of this invention.
Figure 12B:
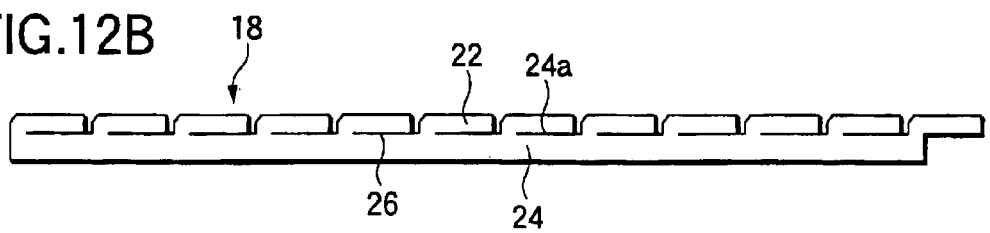
Figure 12C:
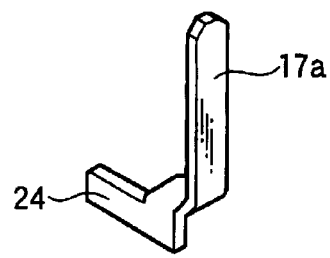

Referring to FIGS. 11 and 12, an embodiment 4 of this invention will be described below. FIG. 11A is a front view of the coil connector 14 and FIG. 11B is a cross-sectional view of the coil connector 14, taken along the line C—C. FIGS. 12A and 12B are expanded views of the conductive members, and FIG. 12C is a perspective view of the connection terminal 17a in which the end portion of the conductive portion is bent. FIG. 12A is an expanded view of the split phase conductive member 17, in which the connection terminal 17a is formed by bending one end portion of the arm portion 22 integral with the strip conductive portion 24 and extending from the side end portion 24a of the strip conductive portion 24 to be almost parallel in the longitudinal direction, as shown in FIG. 12C. FIG. 12B is an expanded view of the common connection terminal 18. The split phase conductive member 17 and the common connection terminal 18 are bent in the shape of FIG. 11 and disposed in the holder 15. The coil connecting terminal portion 25 having a cylindrical shape is provided at the top end portion of the arm portion 22, and the four groove portions 16 provided in the holder 15 have steps in the depth.

In the embodiment 4 as constituted in this manner, the connection terminal 17a is formed integrally by bending the arm portion 22, whereby the yield of material is excellent, and there is no need of welding. Since the conductive member is disposed stepwise, the insulation property of the conductive member is enhanced. Since the coil connecting terminal portion 25 is formed in almost cylindrical shape, the coil terminal 13 inserted is held and the welding operation is excellent.

(Embodiment 5)

Figure 13A:
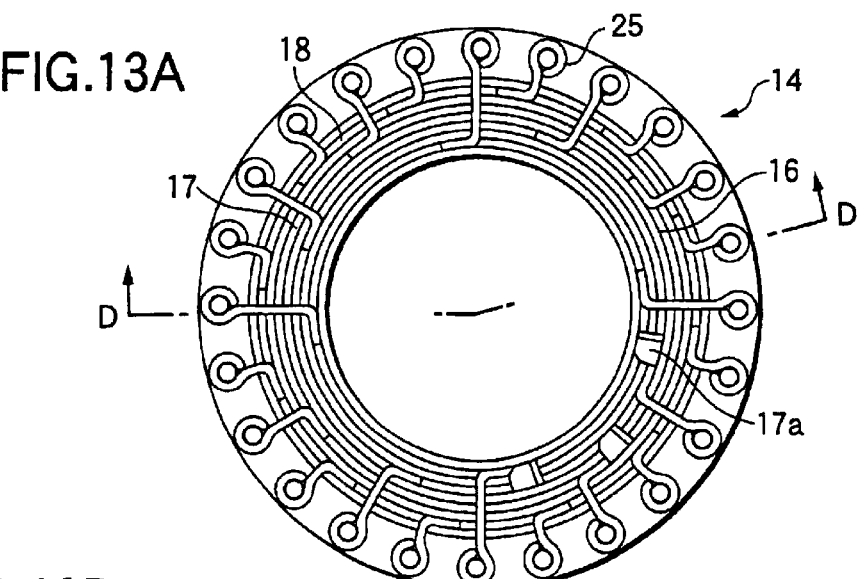
FIGS. 13A and 13B is a front view and a cross-sectional view of a coil connector according to an embodiment 5 of this invention.
Figure 13B:
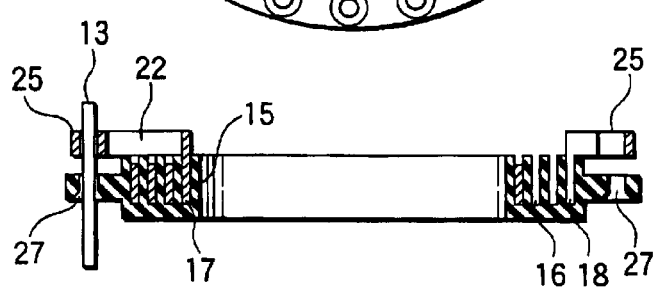
Figure 14A:
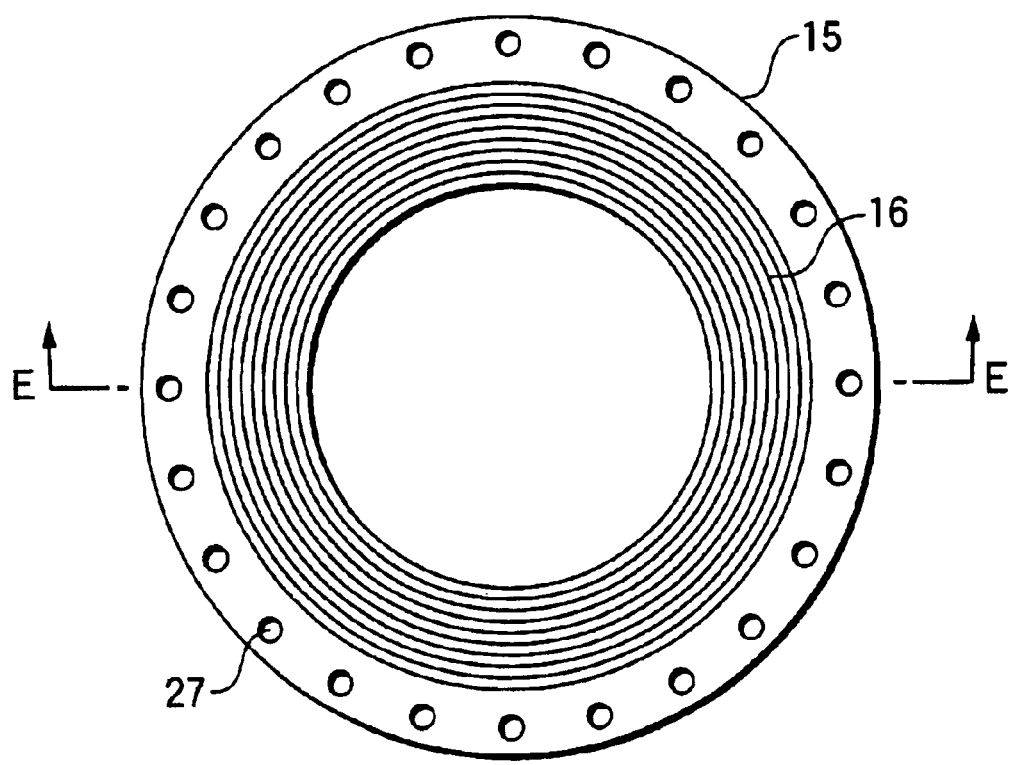
FIGS. 14A and 14B are a front view and a cross-sectional view of a holder according to the embodiment 5 of this invention.
Figure 14B:
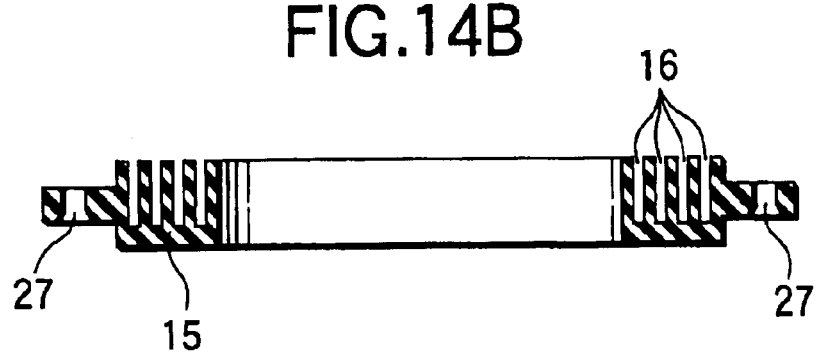

Referring to FIGS. 13 and 14, an embodiment 5 of this invention will be described below. FIG. 13A is a front view of the coil connector 14 and FIG. 13B is a cross-sectional view of the coil connector 14, taken along the line D—D. FIG. 14A is a front view of the holder 15 and FIG. 14B is across-sectional view of the holder 15, taken along the line E—E. In FIG. 13, the coil connector 14 has the split phase conductive member 17 and the in-phase conductive member 18 disposed in the groove portions 16 of concentric circle provided in the holder 15, and the holder 15 has integrally a hole portion 27 as the guide for leading the coil terminal 13 into the cylindrical coil connecting terminal portion 25, as shown in the figure.

In the embodiment 5 as constituted in this manner, the coil terminal 13 is led out through the hole portion 27 serving as the guide and disposed in the coil connecting terminal portion 25 to allow the smooth insertion. Since the coil terminal 13 can be held after insertion, the workability and stability for joining the coil terminal 13 and the coil connecting terminal portion 25 by caulking or welding are enhanced. Since the guide is provided integrally with the holder 15, the constitution is simpler and less expensive.

(Embodiment 6)

Figure 15A:
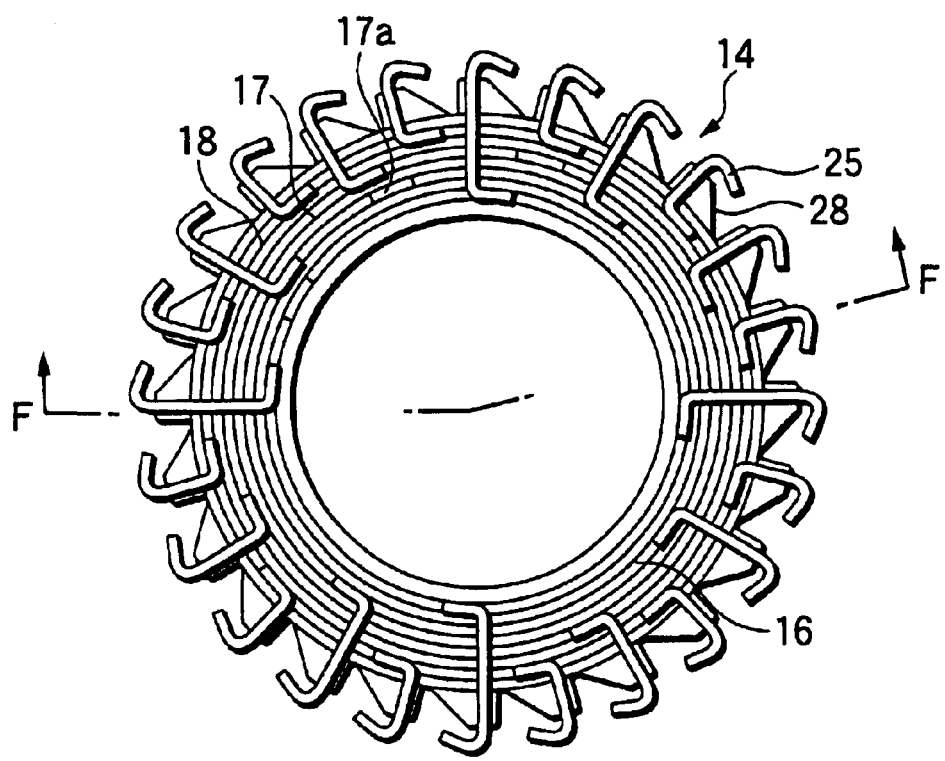
FIGS. 15A and 15B are a front view and a cross-sectional view of a coil connector according to an embodiment 6 of this invention.
Figure 15B:
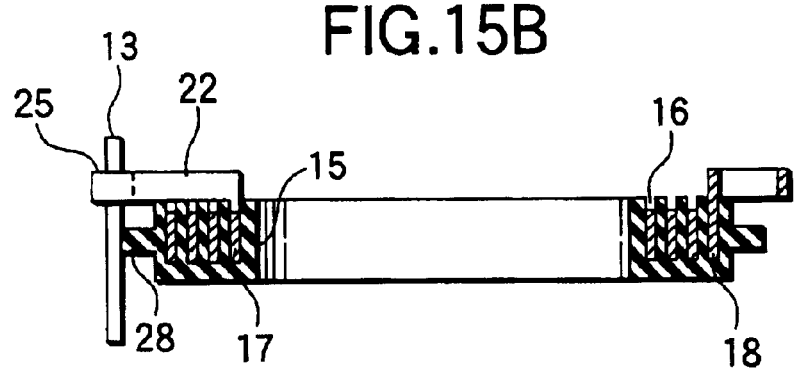
Figure 16A:
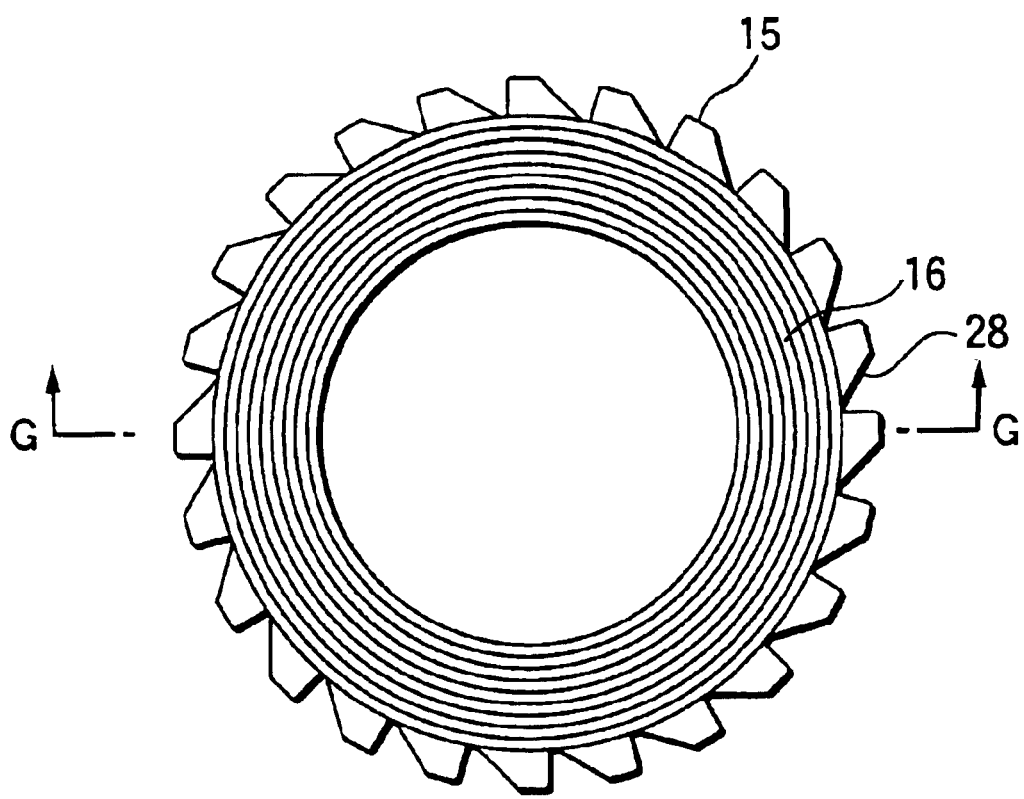
FIGS. 16A and 16B are a front view and a cross-sectional view of a holder according to the embodiment 6 of this invention.
Figure 16B:
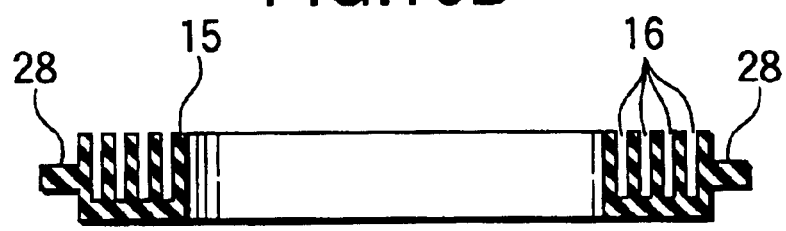
Figure 17A:
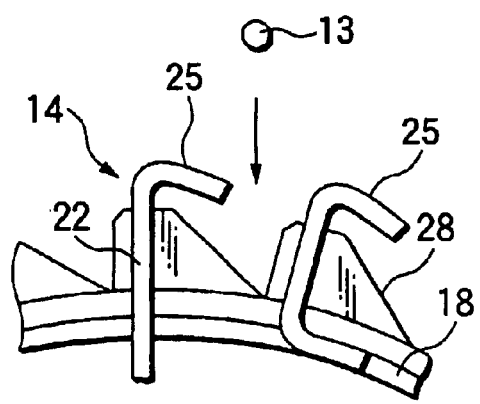
FIGS. 17A to 17D are explanatory views showing how a coil terminal is guided along an inclined portion.
Figure 17B:
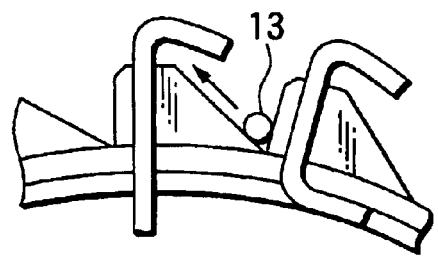
Figure 17C:
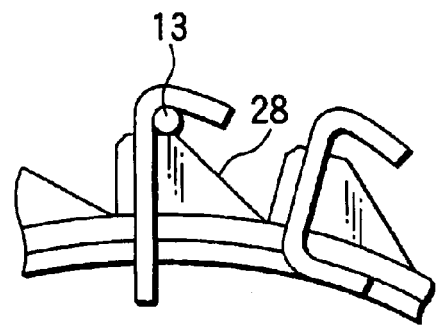
Figure 17D:
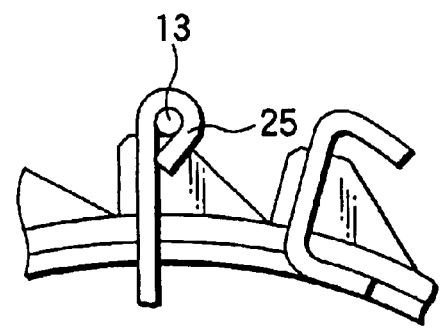

Referring to FIGS. 15 and 16, an embodiment 6 of this invention will be described below. FIG. 15A is a front view of the coil connector 14 and FIG. 15B is a cross-sectional view of the coil connector 14, taken along the line F—F. FIG. 16A is a front view of the holder 15 and FIG. 16B is across-sectional view of the holder 15, taken along the line G—G. In FIG. 15, the coil connector 14 has the split phase conductive member 17 and the in-phase conductive member 18 disposed in the groove portions 16 of concentric circle provided in the holder 15, and the holder 15 has integrally an inclined portion 28 as the guide for leading the coil terminal 13 into the coil connecting terminal portion 25 like the hook, as shown in the figure.

FIG. 17 is an explanatory view showing how the coil terminal 13 is guided into the coil connecting terminal portion 25 via the inclined portion 28. FIG. 17A shows how the coil terminal 13 is inserted in a direction of the arrow to place it between adjacent coil connecting terminal portions 25 like the hook. The coil terminal 13 is moved on the inclined portion 28 in a direction of the arrow by rotating the coil terminal 13 or the coil connector 14 as shown in FIG. 17B, and disposed at a coil root of the coil connecting terminal portion 25 as shown in FIG. 17C. FIG. 17D shows a state where the coil connecting terminal portion 25 is caulked temporarily after the state C to make the joined state or position stable. The coil connecting terminal portion 25 is then securely joined by welding. FIG. 18 is an explanatory view essentially showing an example of another guide. In FIG. 18A, there is a smaller clearance between the hook constituting the coil connecting terminal portion 25 and bent at almost right angles and the outer circumference of the holder 15 to lead the coil connecting terminal portion 25 around the outer circumference of the holder 15 to the hook root. FIG. 18B shows a variation example of FIG. 17 to lead the coil connecting terminal portion 25 to the hook root.

In the embodiment 6 as constituted in this manner, the coil terminal 13 is led out along the inclined portion 28 serving as the guide and disposed in the coil connecting terminal portion 25 to allow the smooth insertion. Since the coil terminal 13 can be held at the hook root after insertion, the workability and stability for joining the coil terminal 13 and the coil connecting terminal portion 25 by caulking or welding are enhanced. Since the guide is provided integrally with the holder 15, the constitution is simpler and less expensive. Moreover, in FIG. 18A, the holder has a circular outer shape, is easily fabricated, and led smoothly. In FIG. 18B, the coil terminal 13 is easily inserted.

(Embodiment 7)

Figure 20:
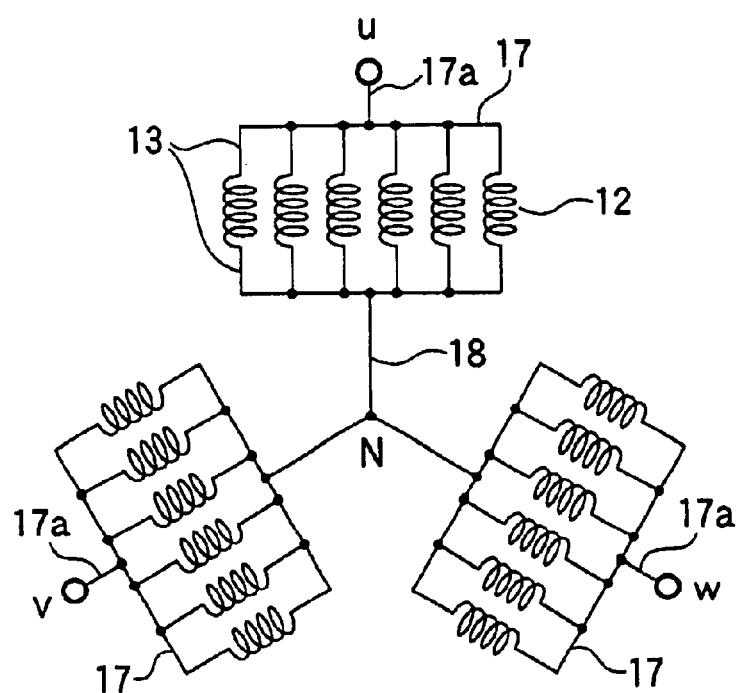
FIG. 20 is a connection view of a stator coil according to the embodiment 7 of this invention.
Figure 21:
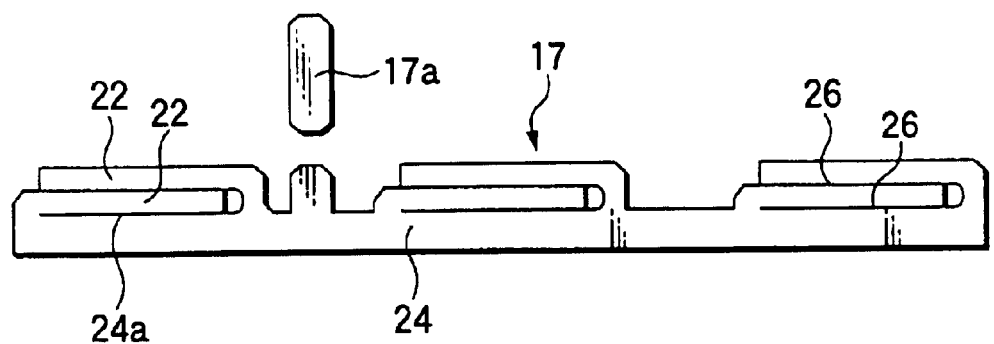
FIG. 21 is an expanded view of a split phase conductive member according to the embodiment 7 of this invention.
Figure 22A:
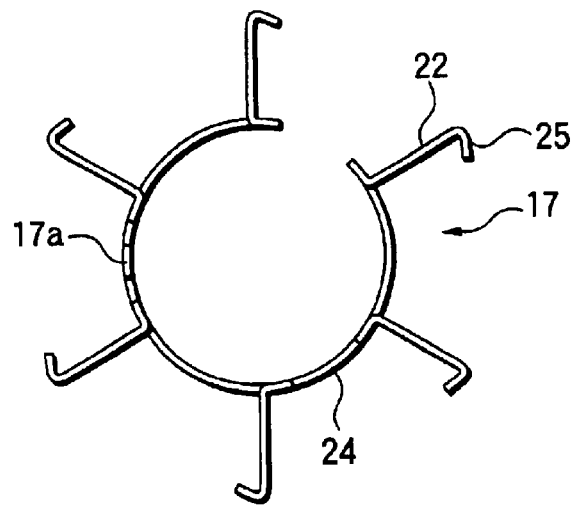
FIGS. 22A to 22C are front views of a split phase conductive member according to the embodiment 7 of this invention.
Figure 22B:
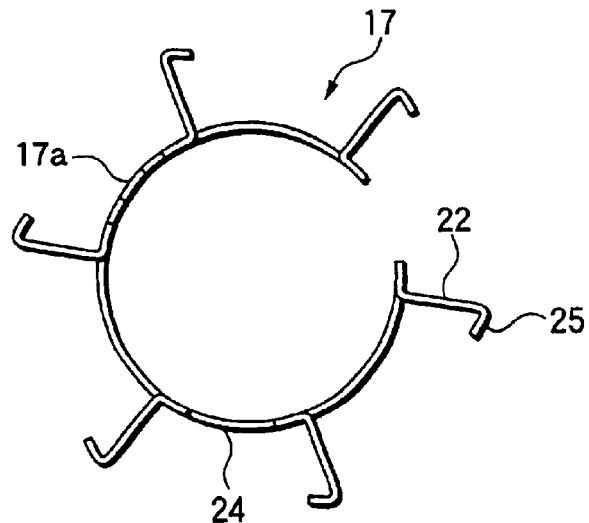
Figure 22C:
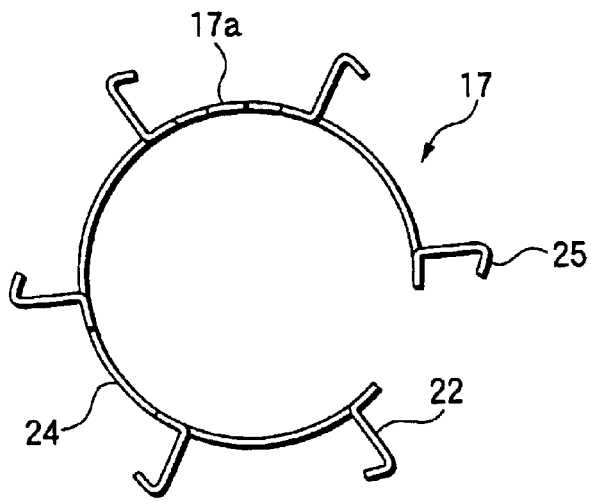

Referring to FIGS. 19 to 22, an embodiment 7 of this invention will be described below. FIG. 19A is a front view of the coil connector 14 and FIG. 19B is a cross-sectional view of the coil connector 14, taken along the line H—H. FIG. 20 is a connection view of the stator coil 12, in which thirty six coil terminals 13 are Y-connected in three phases (18-slot, 6-coil parallel Y-connection), as shown in FIG. 20. The coil connector 14 of FIG. 19 has three split phase conductive members 17 disposed. Though the common conductive member 18 is not shown, for example, the common conductive member 18 may be provided in the coil bobbin 11 on the side of bearing 9 in FIG. 1. FIG. 21 is an expanded view of the split phase conductive member 17, and FIG. 22 is a front view of the split phase conductive member 17. In FIG. 21, 24 denotes the strip conductive portion, which has two stages of arm portion 22 integral with the strip conductive portion 24 and extending from the side end portion 24a of the strip conductive portion 24 to be almost parallel in the longitudinal direction. The split phase conductive member 17 is formed by bending the arm portion 22 in the direction of plate thickness, as shown in FIG. 22. The connection terminal 17a is joined with the strip conductive portion 24 by welding. Three split phase conductive members 17 are disposed in the holder 15 to constitute the coil connector 14, as shown in FIG. 19. Three groove portions 16 of the holder 15 have steps where the split phase conductive members 17 is disposed.

In the embodiment 7 as constituted in this manner, the arm portions 22 are disposed in upper and lower heights. Therefore, when the required length of arm portion 22 is long relative to the peripheral length of the strip conductive portion 24, a large number of arm portions 22 are provided, or the adjacent arm portions 22 are constructed closely, the arm portions can be made in small size, with excellent yield and insulation. Also, the arm portions are inserted successively into the holder 15 from the outer circumferential side and assembled, with excellent assembling capability.

(Embodiment 8)

Figure 23A:
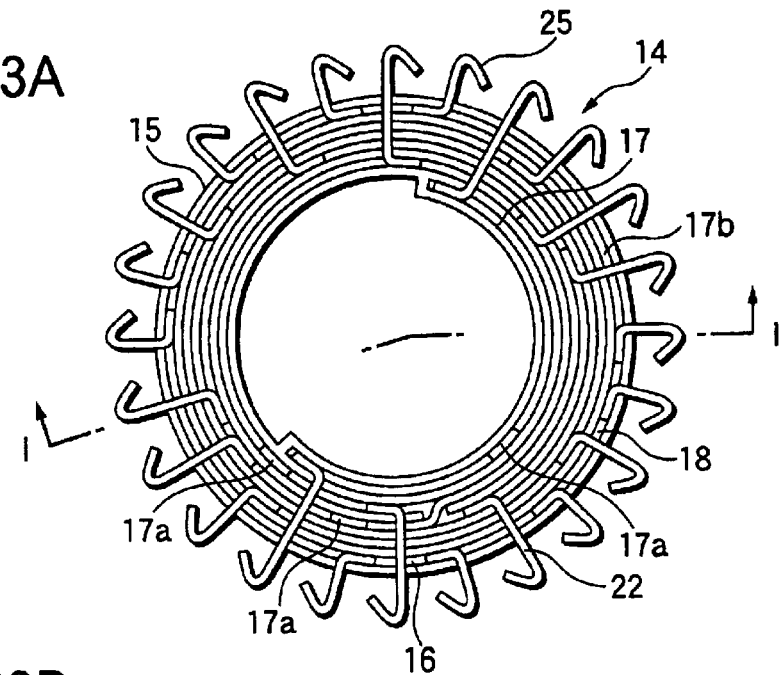
FIGS. 23A and 23B are a front view and a cross-sectional view of a coil connector according to an embodiment 8 of this invention.
Figure 23B:
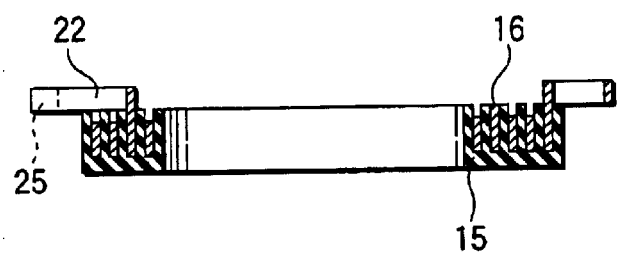
Figure 24:
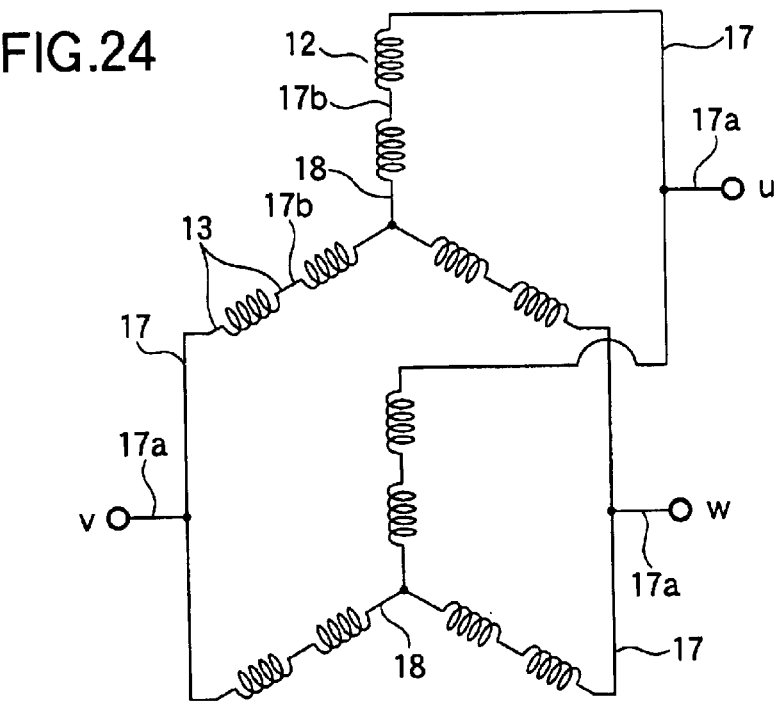
FIG. 24 is a connection view of a stator coil according to the embodiment 8 of this invention.
Figure 25A:
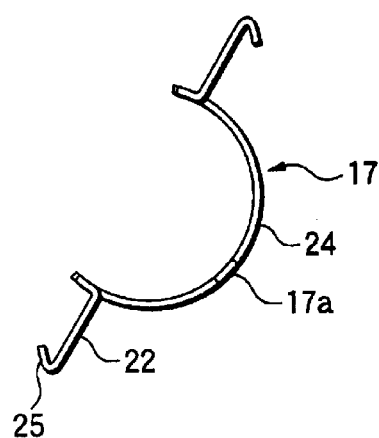
FIGS. 25A to 25F are front views of a split phase conductive member according to the embodiment 8 of this invention.
Figure 25B:
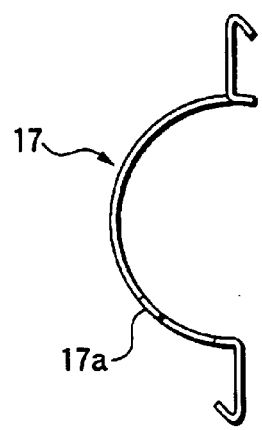
Figure 25C:
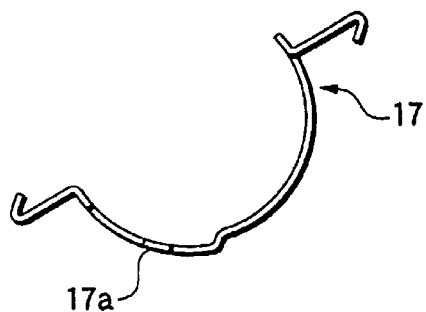
Figure 25D:
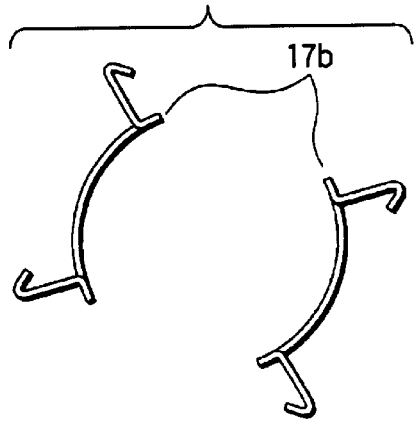
Figure 25E:
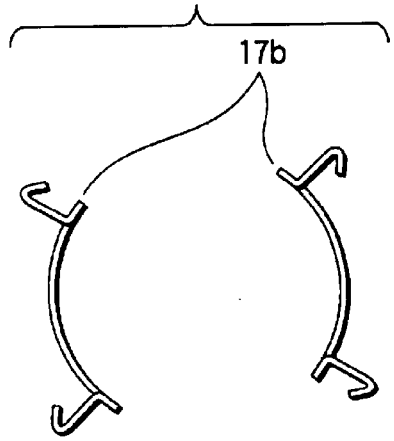
Figure 25F:
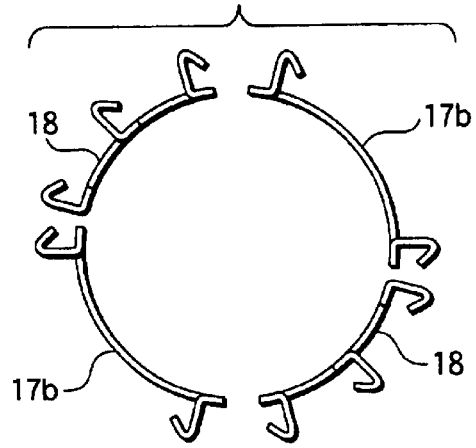

Referring to FIGS. 23 to 25, an embodiment 8 of this invention will be described below. FIG. 23A is a front view of the coil connector 14 and FIG. 23B is a cross-sectional view of the coil connector 14, taken along the line I—I. FIG. 24 is a connection view of the stator coil 12, in which twenty four coil terminals 13 are connected as shown in FIG. 24 (12-slot, 2-coil in series Y-connection in parallel). FIG. 25 is a front view of conductive members, including the split phase conductive member 17, the split phase conductive member 17*b* in series coil portion and the common conductive member 18. The conductive members formed in the shape of FIG. 25 are inserted from the outer circumferential side into the groove portions 16 of the holder 15 in the order of 17*f*, 17*e*, 17*d*, 17*c*, 17*b* and 17*a* to constitute the coil connector 14.

In the embodiment 8 as constituted in this manner, the coil connector 14 is easily applied in a complex connection structure, and the conductive members are inserted successively from the outer circumferential side into the holder 15 and assembled, with excellent assembling capability.

(Embodiment 9)

Figure 26A:
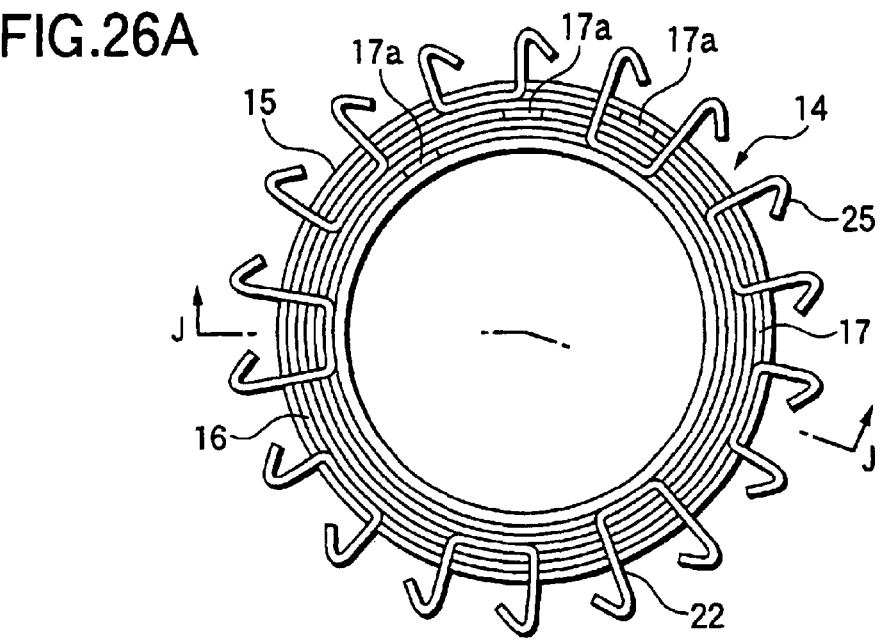
FIGS. 26A and 26B are a front view and a cross-sectional view of a coil connector according to an embodiment 9 of this invention.
Figure 26B:
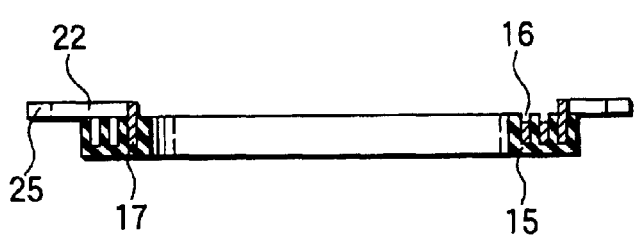
Figure 27:
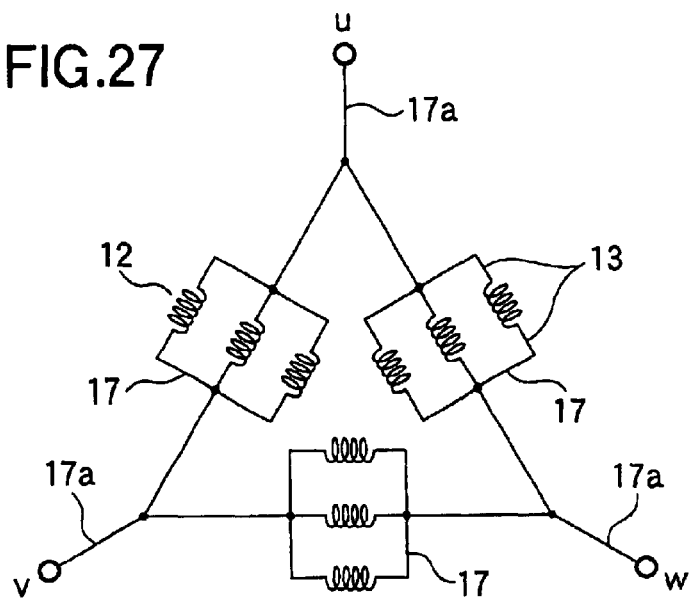
FIG. 27 is a connection view of a stator coil according to the embodiment 9 of this invention.

Referring to FIGS. 26 to 29, an embodiment 9 of this invention will be described below. FIG. 26A is a front view of the coil connector 14 and FIG. 26B is a cross-sectional view of the coil connector 14, taken along the line J—J. FIG. 27 is a connection view of the stator coil 12, in which eighteen coil terminals 13 are connected as shown in FIG. 27 (9-slot, 3-coil parallel Δ-connection). FIG. 28 is an expanded view of the split phase conductive member 17, and FIG. 29 is a front view of the split phase conductive member 17. In FIG. 28, the strip conductive portion 24 comprises the arm portions 22 of T-character shape which are integral with the strip conductive member 24 and extending from the side end portion 24*a* of the strip conductive portion 24 to be almost parallel in the longitudinal direction. The arm portions 22 are bent in the direction of plate thickness to form three split phase conductive portions 17 as shown in FIG. 29. The connection terminal 17*a* is joined with the strip conductive portion 24 by welding. The three split phase conductive members 17 are inserted in the order from the outer circumferential side into the groove portions 16 of the holder 15 to constitute the coil connector 14, as shown in FIG. 26.

In the embodiment 9 as constituted in this manner, the arm portions 22 of the conductive member have T-character shape in expanded state, and are connected to the adjacent coil terminal 13, with excellent assembling capability, and in small size.

(Embodiment 10)

Figure 30A:
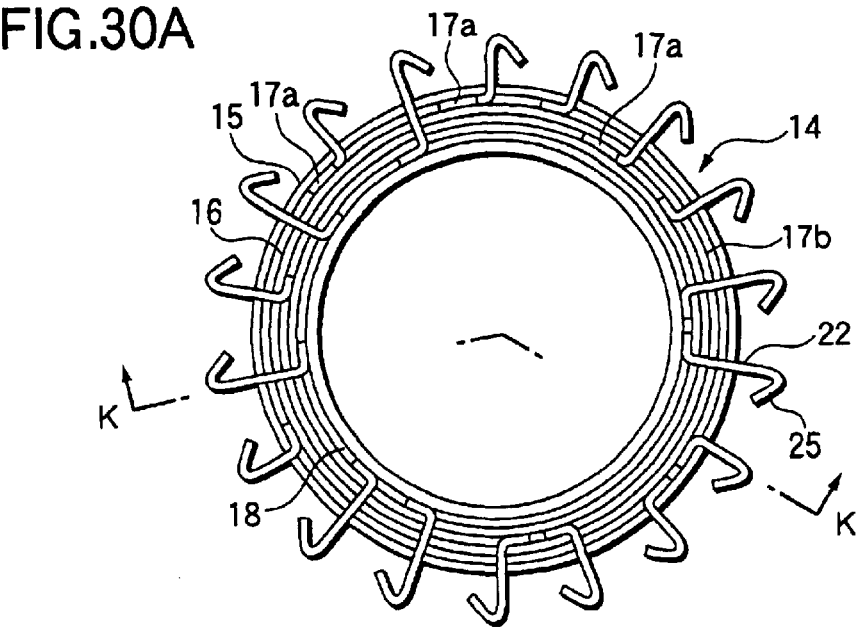
FIGS. 30A and 30B are a front view and a cross-sectional view of a coil connector according to an embodiment 10 of this invention.
Figure 30B:
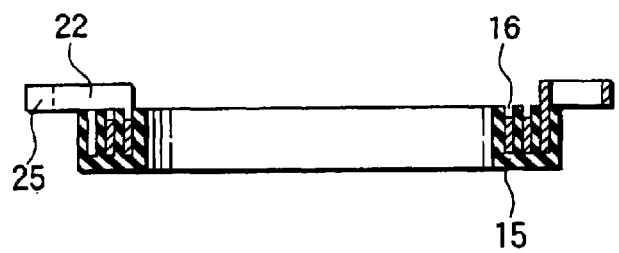
Figure 31:
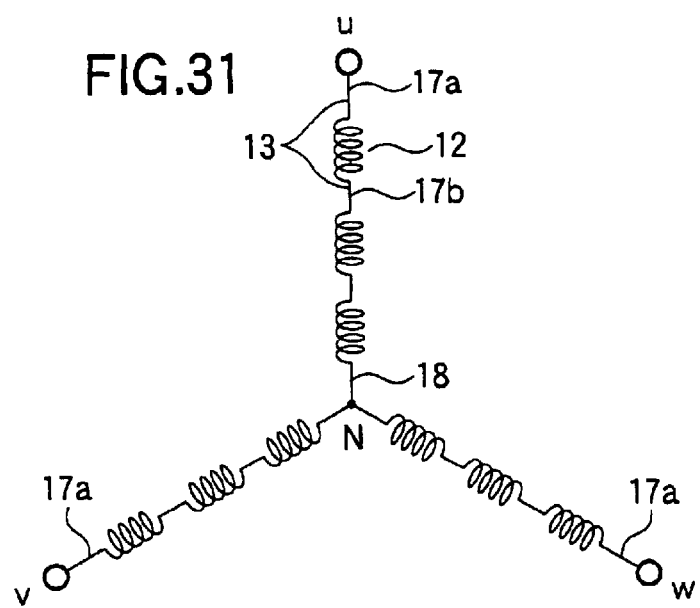
FIG. 31 is a connection view of a stator coil according to the embodiment 10 of this invention.
Figure 32A:
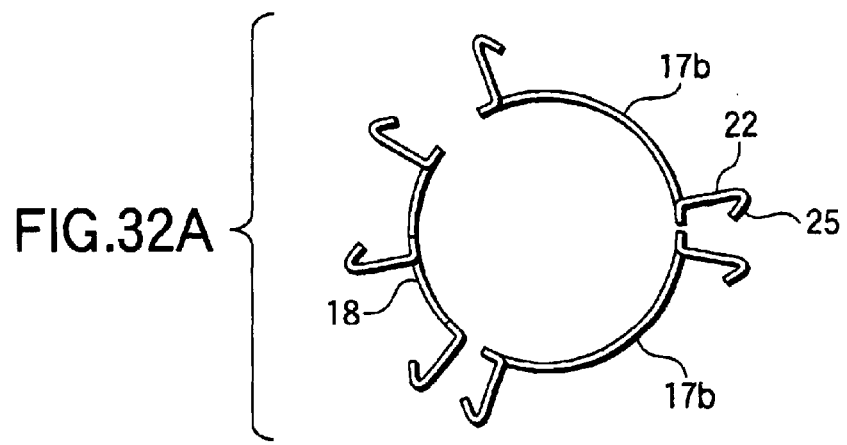
FIGS. 32A to 32C are front views of a conductive member according to the embodiment 10 of this invention.
Figure 32B:
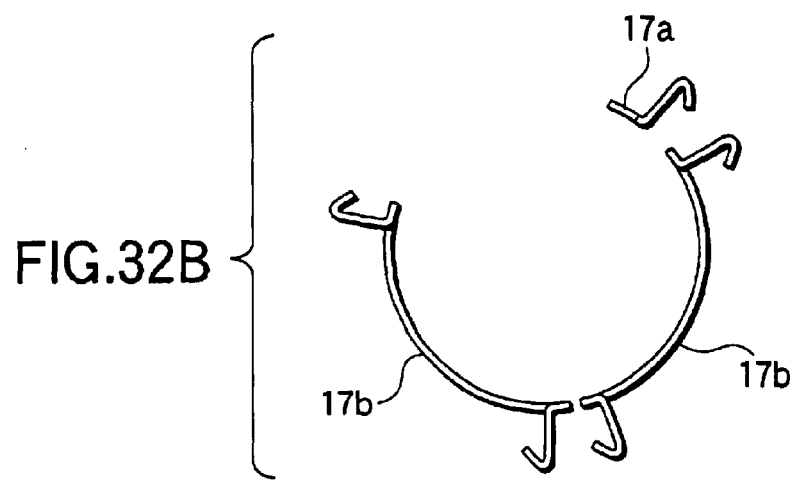
Figure 32C:
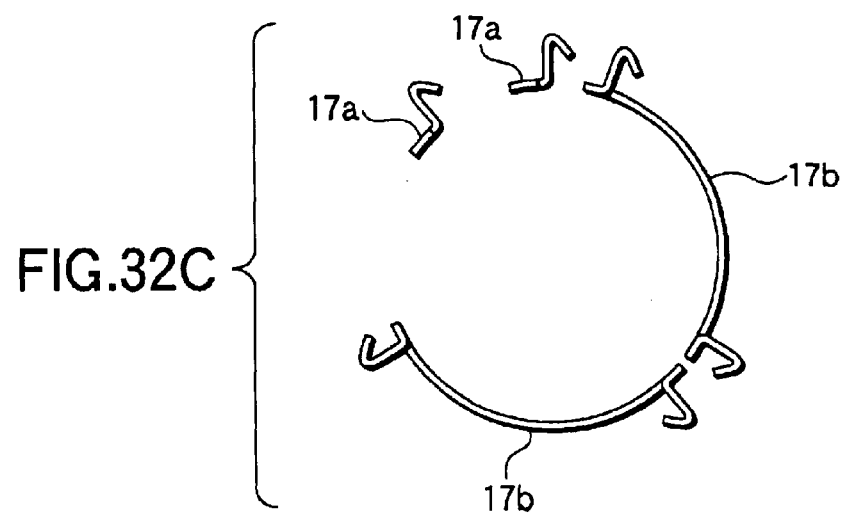

Referring to FIGS. 30 to 32, an embodiment 10 of this invention will be described below. FIG. 30A is a front view of the coil connector 14 and FIG. 30B is a cross-sectional view of the coil connector 14, taken along the line K—K. FIG. 31 is a connection view of the stator coil 12, in which eighteen coil terminals 13 are connected as shown in FIG. 31 (9-slot, 3-coil in series Y-connection). FIG. 32 is a front view of the conductive member such as the phase connecting conductive member 17*b*, the common conductive member 18 and the connection terminal 17*a* in the series coil portion. The conductive portion is inserted in the order of C, B and A of FIG. 32 from the outer circumferential side into the groove portion 16 of the holder 15 of FIG. 30 to constitute the coil connector 14 of FIG. 30. The magnet 6 is composed of six poles.

In the embodiment 10 as constituted in this manner, one split phase conductive member 17*b* in the series coil portion and the common conductive member 18 are disposed in the groove portion 16 on the same circumference to constitute the coil connector 14 with a simple structure.

(Embodiment 11)

Figure 33A:
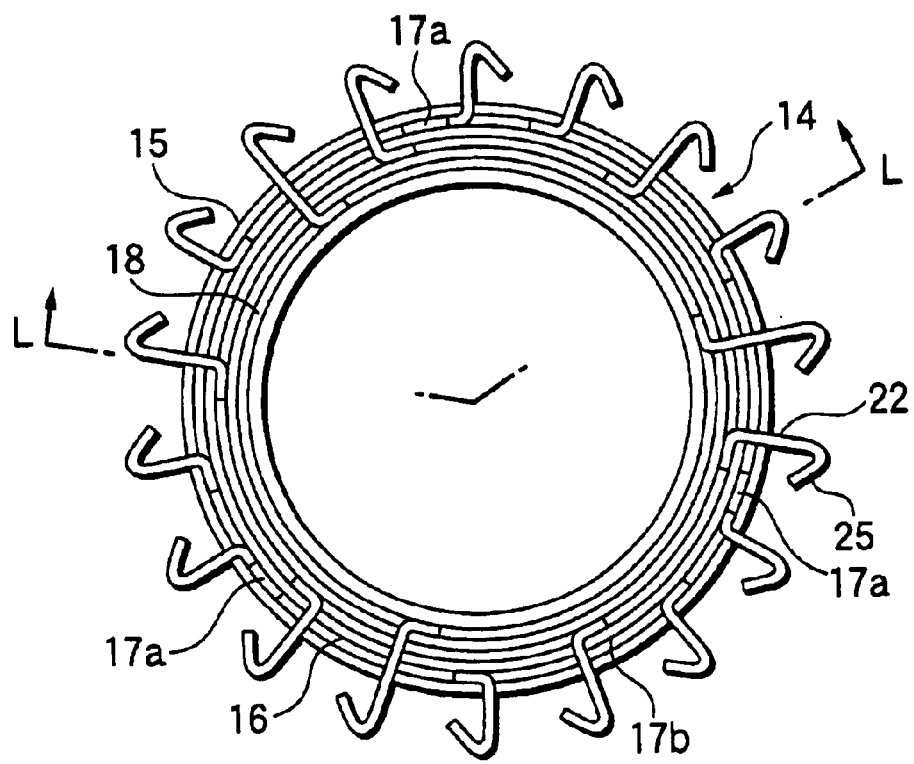
FIGS. 33A and 33B are a front view and a cross-sectional view of a coil connector according to an embodiment 11 of this invention.
Figure 33B:
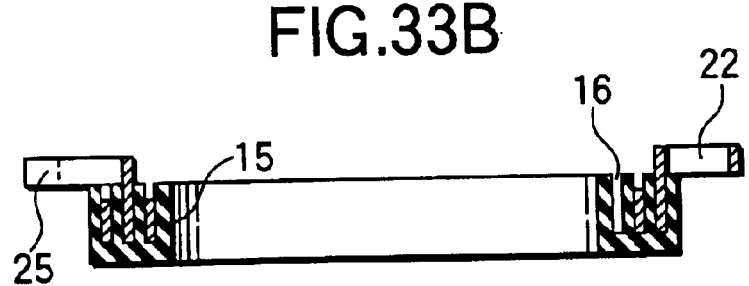
Figure 34A:
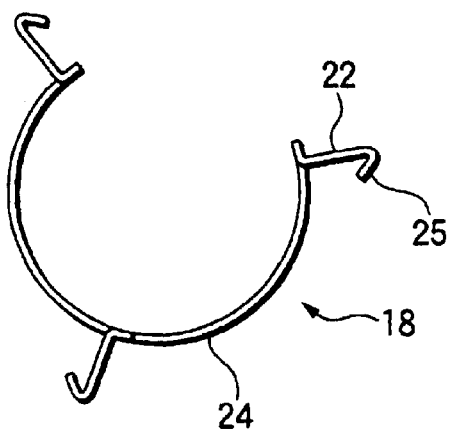
FIGS. 34A to 34C are front views of a conductive member according to the embodiment 11 of this invention.
Figure 34B:
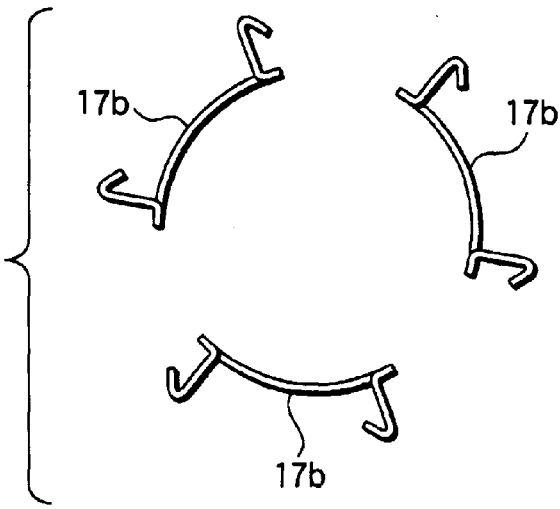
Figure 34C:
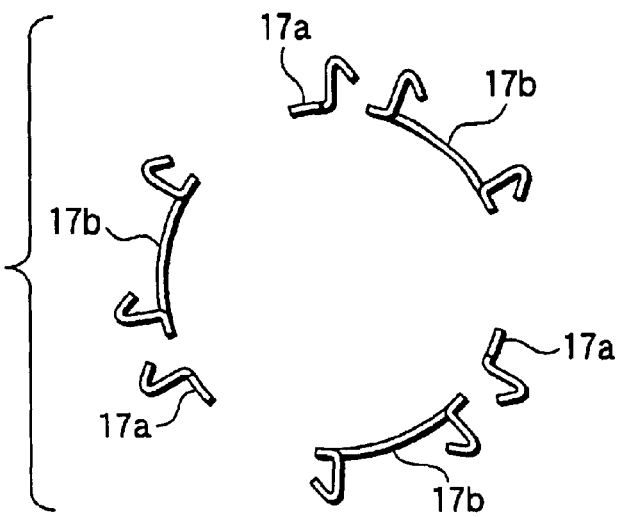

Referring to FIGS. 33 and 34, an embodiment 11 of this invention will be described below. FIG. 33A is a front view of the coil connector 14 and FIG. 33B is a cross-sectional view of the coil connector 14, taken along the line L—L. The connection view is the same as that shown in FIG. 31 (9-slot, 3-coil in series, Y-connection), except that the magnet 6 is composed of eight poles, all the eighteen stator coils 12 have the same winding direction, and the direction of energizing some stator coils 12 is reversed. FIG. 34 is a front view of the conductive member such as the phase connecting conductive member 17*b*, the common conductive member 18 and the connection terminal 17*a* in the series coil portion. The conductive portion is inserted in the order of C, B and A of FIG. 34 from the outer circumferential side into the groove portion 16 of the holder 15 of FIG. 33 to constitute the coil connector 14 of FIG. 33.

In the embodiment 11 as constituted in this manner, the stator coils 12 have the same winding direction, and the coil connector 14 is employed to make a connection as shown in FIG. 31, where by the winding process is performed at high productivity without changing the winding direction.

(Embodiment 12)

Figure 35A:
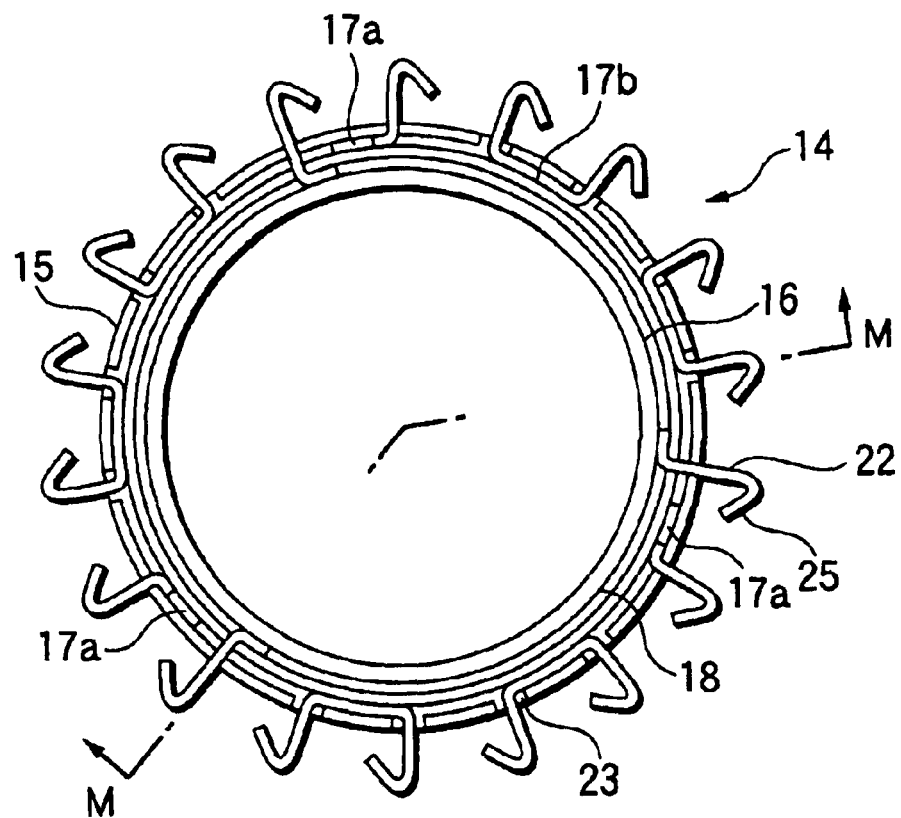
FIGS. 35A and 35B are a front view and a cross-sectional view of a coil connector according to an embodiment 12 of this invention.
Figure 35B:
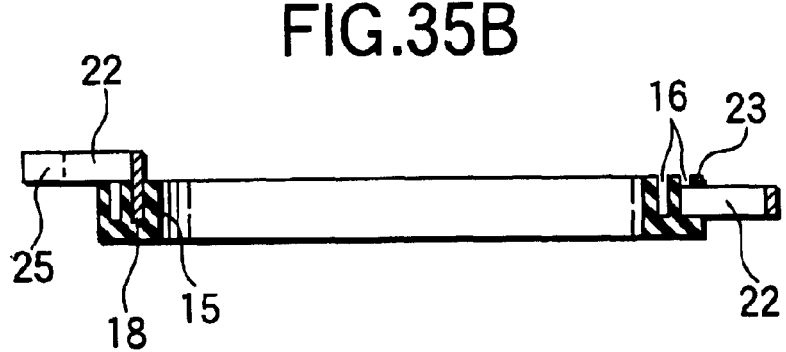
Figure 36A:
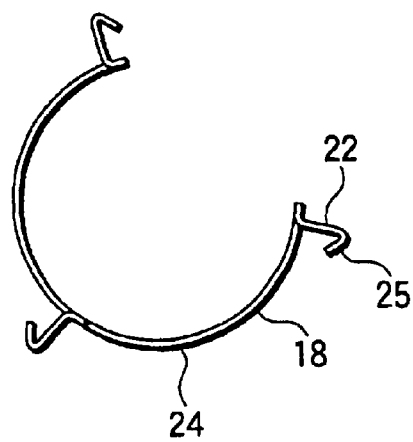
FIGS. 36A to 36D are front views of a conductive member according to the embodiment 12 of this invention.
Figure 36B:
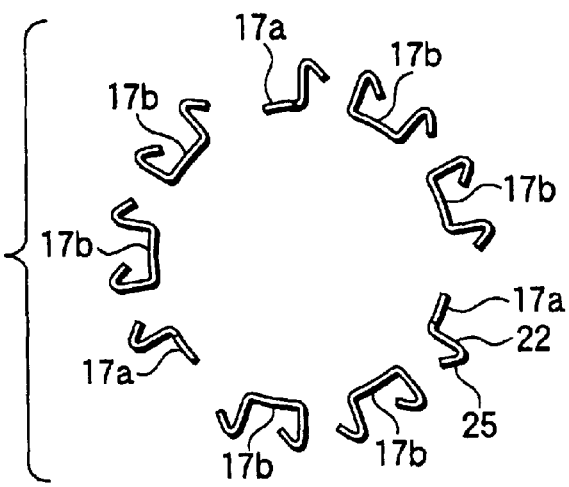
Figure 36C:
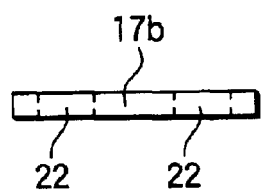
Figure 36D:
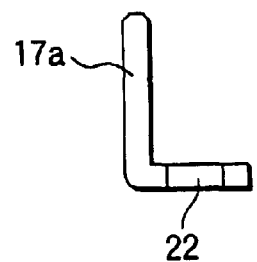

Referring to FIGS. 35 and 36, an embodiment 12 of this invention will be described below. FIG. 35A is a front view of the coil connector 14 and FIG. 35B is a cross-sectional view of the coil connector 14, taken along the line M—M. The connection view is the same as that shown in FIG. 31 (9-slot, 3-coil in series, Y-connection), except that the magnet 6 is composed of eight poles, and some of the eighteen stator coils 12 have the reverse winding direction. FIG. 36 is a front view and an expanded view of the conductive member such as the phase connecting conductive member 17*b*, the common conductive member 18 and the connection terminal 17*a* in the series coil portion. FIG. 36A is a front view of the common conductive member 18, which is bent in a direction of plate thickness as shown in the figure. FIG. 36B is a front view of the split phase conductive member 17*b* and the connection terminal 17*a* in the series coil portion. FIG. 36C is an expanded view of the split phase conductive member 17*b* in the series coil portion. FIG. 36D is an expanded view of the connection terminal 17*a*. These conductive members are disposed in the groove portions 16 of the holder 15 to constitute the coil connector 14 of FIG. 35. In this embodiment, the order of disposing A and B of FIG. 36 does not matter. The arm portions 22 for the split phase conductive member 17*b* and the connection terminal 17*a* in the series coil portion are inserted into the groove portions 23 of the holder 15.

In the embodiment 12 as constituted in this manner, some of the stator coils 12 have the reverse winding direction, whereby the connection as shown in FIG. 31 is enabled with the conductive members of simple shape as shown in FIG. 36, with a good yield of material and the excellent workability for the conductive member. Also, two groove portions 16 of the holder 15 are provided, and the coil connector 14 is simple. As described in the embodiment 12, the number of slots and the coil connection may be widely changed, the conductive member has a good yield of material and various shapes can be easily made, with excellent assembling capability and the joining of coil, whereby the rotating electric machine can be produced inexpensively and with excellent performance.

(Embodiment 13)

Figure 37:
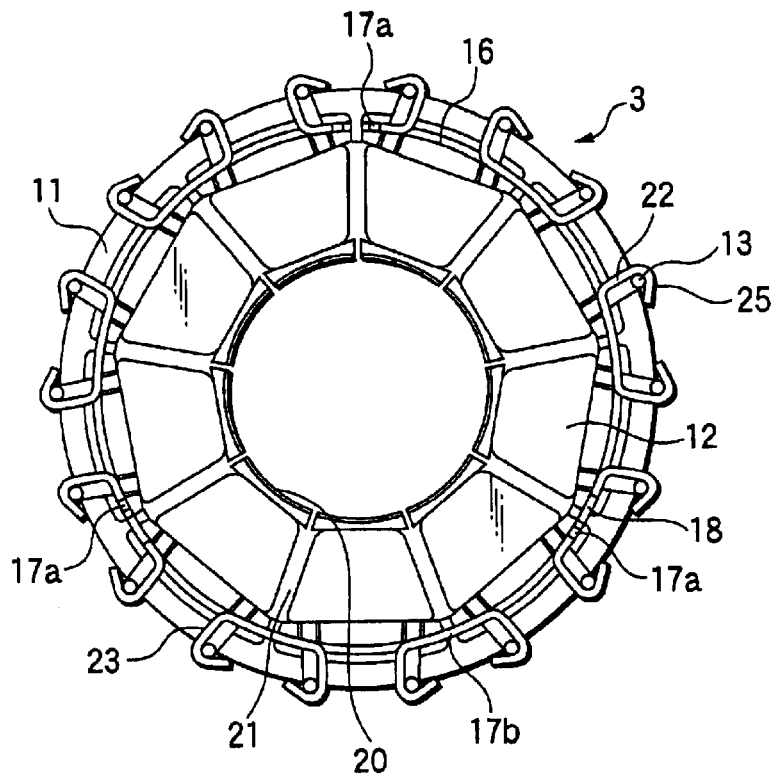
FIG. 37 is a front view of a stator according to an embodiment 13 of this invention.
Figure 38:
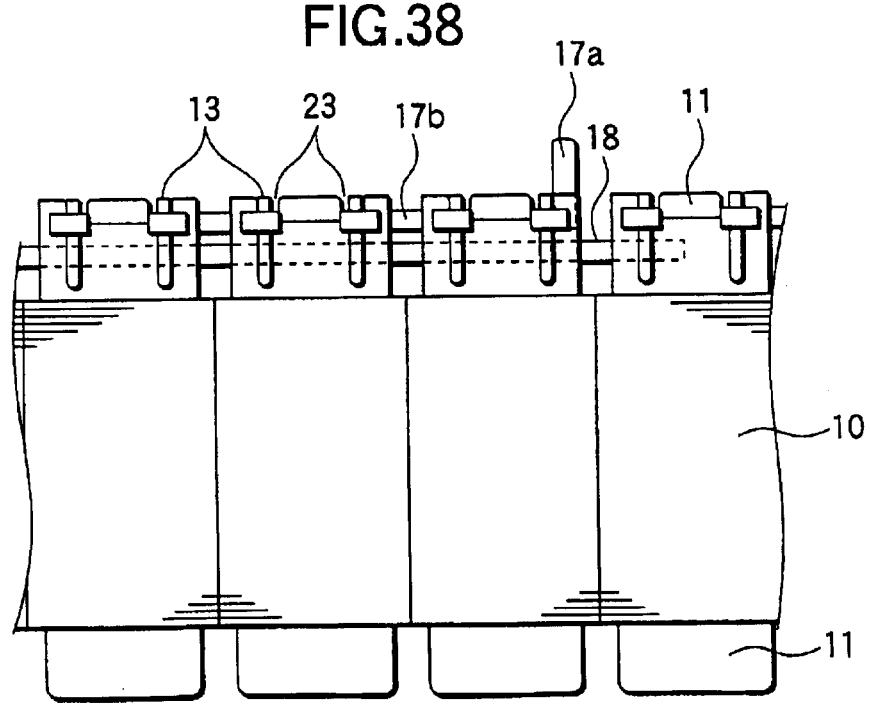
FIG. 38 is a front view of the stator according to the embodiment 13 of this invention.
Figure 39A:
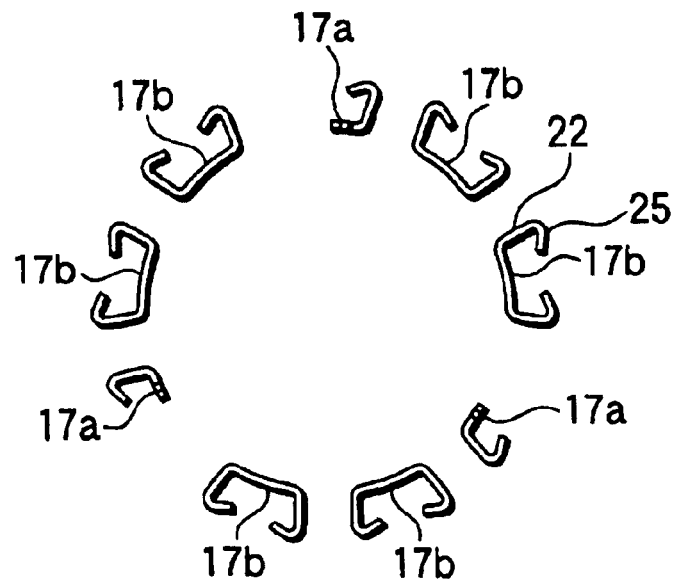
FIGS. 39A and 39B are front views of a conductive member according to the embodiment 13 of this invention.
Figure 39B:
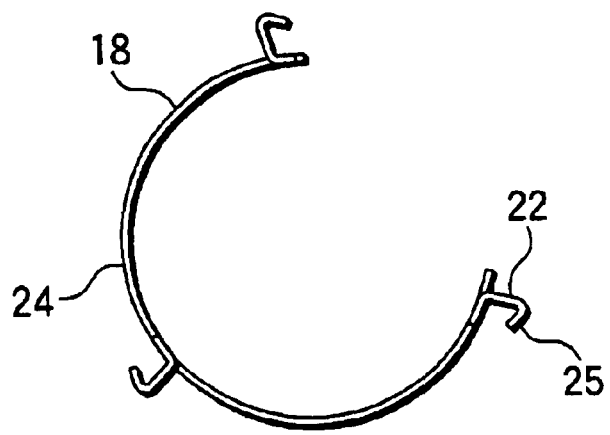

Referring to FIGS. 37 to 39, an embodiment 13 of this invention will be described below. FIG. 37 is a front view of the stator 3 and FIG. 38 is a side view of the stator 3. The connection view is the same as that shown in FIG. 31 (9-slot, 3-coil in series, Y-connection), except that the magnet 6 is composed of eight poles, and some of the eighteen stator coils 12 have the reverse winding direction. FIG. 39 is a front view of the conductive member such as the phase connecting conductive member 17b, the common conductive member 18 and the connection terminal 17a in the series coil portion. FIG. 39A is a front view of the split phase conductive member 17b and the connection terminal 17a in the series coil portion, and FIG. 39B is a front view of the common conductive member 18. As shown in FIGS. 37 and 38, the coil bobbin 11 as the insulating material fitted to the stator iron core 10 is formed with the groove portions 16 and the groove portions 23 integrally, into which the split phase conductive member 17b, the common conductive member 18 and the connection terminal 17a in the series coil portion are disposed. Firstly, the common conductive member 18 is disposed in FIG. 39B, and then the split phase conductive member 17b and the connection terminal 17a in the series coil portion are disposed axially at two steps, as shown in FIG. 39A. Thereafter, eighteen coil terminals 13 are joined with the coil connecting terminal portion 25 to make a predetermined connection.

In the embodiment 13 as constituted in this manner, some of the stator coils 12 have the reverse winding direction, whereby the connection as shown in FIG. 31 is enabled with the conductive members of simple shape as shown in FIG. 39, with a good yield of material and the excellent workability for the conductive member. Also, the coil bobbin 11 as the insulating material is formed with the groove portions 16 and the groove portions 23 integrally, into which the conductive members are disposed, whereby there is no need for providing the holder 15. Hence, the vibration resistance is improved and the resistance of conductive members is decreased to enhance the performance, whereby the rotating electric machine can be fabricated in small size, with high performance, and inexpensively. For example, the common conductive member 18 may be disposed in the coil bobbin 11 on the side of the bearing 9, as shown in FIG. 1, in which the conductive members are easily disposed and the size can be reduced. As disclosed in the Unexamined Japanese Patent Application Publication No. Hei 1-252141, the strip stator iron core 10 has the stator coil 12 wound around, and then bent circularly, and applied to the rotating electric machine, whereby it is omitted to bend the strip conductive portion 24 like a circular arc.

(Embodiment 14)

Figure 40A:
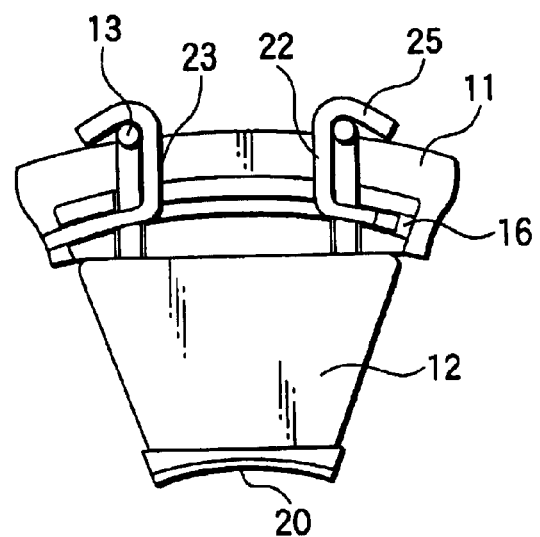
FIGS. 40A to 40C are front views of a stator coil according to an embodiment 14 of this invention.
Figure 40B:
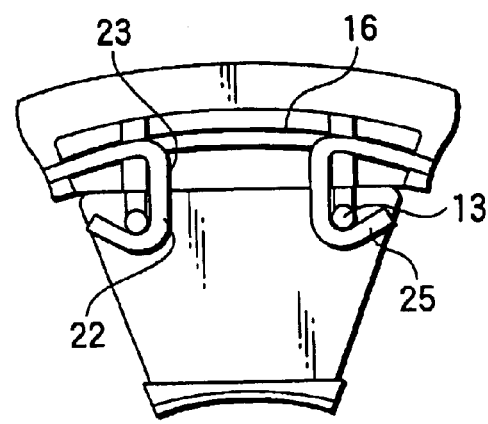
Figure 40C:
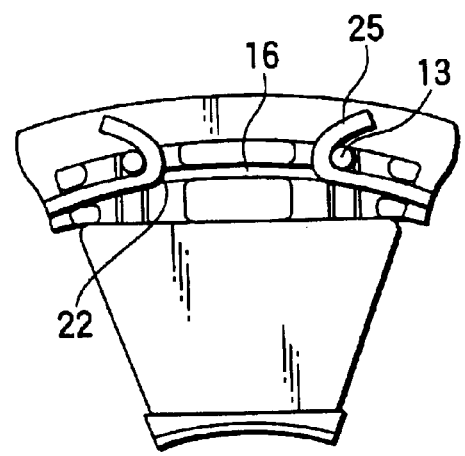

Referring to FIG. 40, an embodiment 14 of this invention will be described below. FIG. 40 is a front view of one stator coil 12 which is another form of the embodiment 13. The bending direction or position of the arm portion 22 or the coil connecting terminal portion 25 is changed. In FIG. 40A, as in the embodiment 13, the arm portion 22 juts out on the outer circumferential side, and the coil joining jig is inserted from the outer circumferential side. In FIG. 40B, the arm portion 22 is bent on the inner circumferential side, and the coil connecting terminal portion 25 is provided on the inner circumferential side. In FIG. 40C, the arm portion 22 is short, and the coil connecting terminal portion 25 is inward from the outer diameter of the stator 3.

In the embodiment 14 as constituted in this manner, in the case of FIG. 40A, the coil joining jig can be easily inserted from the outer cumferential side to make the joining operation excellent. In the case of FIG. 40B, the coil connecting terminal portion 25 does not jut out on the outer circumferential side to protect the joining portion, with the smaller size. In the case of FIG. 40C, the coil connecting terminal portion 25 does not jut out on the inner and outer circumferential side to be compact and allow the coil terminal 13 to be easily supplied to the hook, with excellent workability.

In the above embodiments, the stator coil 12 has a round winding, but may have a straight angle wiring, or two parallel windings may be provided. Moreover, stator coil 12 is not limited to the concentrated winding and the three-phase connection.

Though the rotating electric machine is described using the brushless motor, it may be a dynamo or a generator motor. Particularly, the rotating electric motor can be applied to the vehicle to exhibit the effect more remarkably.

As described above, a rotating electric machine as defined in aspect 1 of the present invention comprises a conductive member including a strip conductive portion and an arm portion integral with the strip conductive portion and extending from a side end portion of the strip conductive portion to be almost parallel in a longitudinal direction, the arm portion being bent in a direction of plate thickness for the strip conductive portion, an insulating material for holding the conductive member, and a plurality of wound coils, wherein the coil is connected to the arm portion. Hence, the yield of material for the conductive member is excellent, the bonding with the coil is excellent, and the resistance value is low and stable. Accordingly, the rotating electric machine is inexpensive, and superior in the productivity and performance.

The rotating electric machine as defined in aspect 2 is characterized in that a coil connecting terminal portion formed in the arm portion has a hook shape. Hence, the coil connecting terminal is easily produced, the coil terminal is easily disposed, the bonding with the coil is excellent, and the resistance value is low and stable. Accordingly, the rotating electric machine is inexpensive, and superior in the productivity and performance.

The rotating electric machine as defined in aspect 3 is characterized in that the coil connecting terminal portion formed in the arm portion has a hook shape of being bent in the almost same direction as the circumference direction. Hence, the coil connecting terminal is easily produced, and the coil terminal is easily disposed or welded. Accordingly, the rotating electric machine is inexpensive, and superior in the productivity and performance.

The rotating electric machine as defined in aspect 4 is characterized in that an in-phase split phase conductive member among the conductive members is divided into plural sections, each section having a connection terminal. Hence, the yield of material is excellent, the resistance value is low and stable, and the conductive member is easily disposed in the groove portion. Accordingly, the rotating electric machine is inexpensive, and superior in the productivity and performance.

The rotating electric machine as defined in aspect 5 is characterized in that a connection terminal for the split phase conductive member among the conductive members is formed by using both the end portions of the strip conductive portion for the split phase conductive member. Hence, the yield of material for the conductive member is excellent, the resistance value is low, stable and even, and no bonding of the connection terminal is needed. Accordingly, the rotating electric machine is inexpensive, and superior in the productivity and performance.

The rotating electric machine as defined in aspect 6 is characterized in that the connection terminal for the split phase conductive member among the conductive members is formed by bending an end portion of the strip conductive portion for the split phase conductive member within the almost same plane as the strip conductive portion. Hence, the yield of material for the conductive member is excellent, and no bonding of the connection terminal is needed. Accordingly, the rotating electric machine is inexpensive, and superior in the productivity.

The rotating electric machine as defined in aspect 7 is characterized in that the insulating material has a groove portion for insulating a plurality of conductive members from each other, the conductive member being disposed in the groove portion. Hence, the insulation and vibration resistance are excellent, and the assembling is easy. Accordingly, the rotating electric machine is inexpensive, and superior in the productivity.

The rotating electric machine as defined in aspect 8 is characterized in that the insulating material has a groove portion of almost concentric circle for insulating a plurality of conductive members from each other, the conductive member being disposed like almost concentric circle in the groove portion. Hence, the insulation and vibration resistance are excellent, the assembling capability is high, and the size is reduced. Accordingly, the rotating electric machine is inexpensive, and superior in the productivity and performance.

The rotating electric machine as defined in aspect 9 is characterized in that a common conductive member among the conductive members is disposed on the outer circumferential side of the groove portion of almost concentric circle for the insulating material. Hence, the yield of material for the conductive material is excellent, the size is reduced, and the resistance is lowered. Accordingly, the rotating electric machine is inexpensive, and superior in the performance.

The rotating electric machine as defined in aspect 10 is characterized in that the insulating material has a guide for leading the coil terminal to the coil connecting terminal portion. Hence, the coil terminal is easily disposed to make the position of coil stable, and welded in good condition. Accordingly, the rotating electric machine is superior in the productivity and performance The rotating electric machine as defined in aspect 11 is characterized in that the insulating material has a groove portion through which the arm portion is inserted. Hence, the insulation and vibration resistance are excellent, and the assembling capability is high. Accordingly, the rotating electric machine is superior in the productivity and performance.

The rotating electric machine as defined in aspect 12 is characterized by further comprising a coil bobbin for insulating an iron core and a coil, in which the groove portion is formed integrally with the coil bobbin, and the conductive member is disposed in the groove portion. Hence, the resistance is small, the vibration resistance is excellent, the number of parts is small, and the size is reduced. Accordingly, the rotating electric machine is inexpensive, and superior in the productivity and performance.

A method for manufacturing a rotating electric machine as defined in aspect 13 of this invention includes a step of forming a conductive member including a strip conductive portion and an arm portion integral with the strip conductive portion and extending from a side end portion of the strip conductive portion to be almost parallel in a longitudinal direction, the arm portion being bent in a direction of plate thickness for the strip conductive portion, a step of disposing the conductive member in an insulating material having a groove portion of almost concentric circle, and a step of connecting electrically a coil to the arm portion. Hence, the yield of material for the conductive material is excellent, the insulation is excellent, the constitution is simple, the size is reduced, and the bonding with the coil is excellent. Accordingly, the rotating electric machine is inexpensive, and superior in the performance.

What is claimed is:

1. A rotating electric machine comprising:

a conductive member including a strip conductive portion and an arm portion integral with said strip conductive portion and extending from a side end portion of said strip conductive portion to be almost parallel in a longitudinal direction of said strip conductive portion, said arm portion being bent in a direction of plate thickness for said strip conductive portion;

an insulating material for holding said conductive member; and a plurality of wound coils, wherein at least one of said coils is connected to said arm portion.

2. The rotating electric machine according to claim 1, wherein a coil connecting terminal portion formed in said arm portion has a hook shape.

3. The rotating electric machine according to claim 2, wherein said coil connecting terminal portion formed in said arm portion has a hook shape of being bent in the almost same direction as the circumference direction.

4. The rotating electric machine according to claim 1, wherein an in-phase split phase conductive member among said conductive members is divided into plural sections, each section having a connection terminal.

5. The rotating electric machine according to claim 4, wherein a connection terminal for said split phase conductive member among said conductive members is formed by using both the end portions of the strip conductive portion for said split phase conductive member.

6. The rotating electric machine according to claim 5, wherein said connection terminal for said split phase conductive member among said conductive members is formed by bending an end portion of the strip conductive portion for said split phase conductive member within the almost same plane as said strip conductive portion.

7. The rotating electric machine according to claim 1, wherein said insulating material has a groove portion for insulating a plurality of conductive members from each other, said conductive member being disposed in said groove portion.

8. The rotating electric machine according to claim 1, wherein said insulating material has a groove portion of almost concentric circle for insulating a plurality of conductive members from each other, said conductive member being disposed like almost concentric circle in said groove portion.

9. The rotating electric machine according to claim 8, wherein a common conductive member among said conductive members is disposed on the outer circumferential side of said groove portion of almost concentric circle for said insulating material.

10. The rotating electric machine according to claim 2, wherein said insulating material has a guide for leading a coil terminal to said coil connecting terminal portion.

11. The rotating electric machine according to claim 1, wherein said insulating material has a groove portion through which said arm portion is inserted.

12. The rotating electric machine according to claim 11, further comprising:

a coil bobbin for insulating an iron core and a coil, in which said groove portion is formed integrally with said coil bobbin, and said conductive member is disposed in said groove portion.

13. A method for manufacturing a rotating electric machine, comprising:

a step of forming a conductive member including a strip conductive portion and an arm portion integral with said strip conductive portion and extending from a side end portion of said strip conductive portion to be almost parallel in a longitudinal direction, said arm portion being bent in a direction of plate thickness for said strip conductive portion;

a step of disposing said conductive member in an insulating material having a groove portion of almost concentric circle; and a step of connecting electrically a coil to said arm portion.

14. A rotating electric machine comprising:

a conductive member including a strip conductive portion and an arm portion integral with said strip conductive portion and extending from a side end portion of said strip conductive portion to be almost parallel in a longitudinal direction, said arm portion being bent in a direction of plate thickness for said strip conductive portion;

an insulating material for holding said conductive member; and a plurality of wound coils, wherein at least one of said coils is connected to said arm portion, and wherein a coil connecting terminal portion formed in said arm portion has a hook shape.

15. The rotating electric machine according to claim 14, wherein said coil connecting terminal portion formed in said arm portion has a hook shape of being bent in the almost same direction as the circumference direction.

16. The rotating electric machine according to claim 14, wherein said insulating material has a guide for leading a coil terminal to said coil connecting terminal portion.

17. A rotating electric machine comprising:

a conductive member including a strip conductive portion and an arm portion integral with said strip conductive portion and extending from a side end portion of said strip conductive portion such that a long axis of said and portion is almost parallel to a longitudinal direction of said strip conductive portion, said arm portion being bent in a direction of plate thickness for said strip conductive portion;

an insulating material for holding said conductive member, and a plurality of wound coils, wherein at least one of said coils is connected to said arm portion.

* * * * *